United States Patent [19]
Tanaka

[11] Patent Number: 5,407,055
[45] Date of Patent: Apr. 18, 1995

[54] CONVEYOR APPARATUS AND METHOD HAVING FLEXIBLE GOODS RECEPTACLE MEMBERS

[75] Inventor: Nobuhiro Tanaka, Saitama, Japan

[73] Assignee: Kao Corporation, Tokyo, Japan

[21] Appl. No.: 153,202

[22] Filed: Nov. 16, 1993

[30] Foreign Application Priority Data

Nov. 19, 1992 [JP] Japan ................................. 4-332240
Nov. 19, 1992 [JP] Japan ................................. 4-332241

[51] Int. Cl.$^6$ ............................................. B65G 25/00
[52] U.S. Cl. ..................................... 198/429; 198/715
[58] Field of Search ................. 198/715, 429, 430, 434

[56] References Cited

U.S. PATENT DOCUMENTS

| | | | |
|---|---|---|---|
| 1,112,440 | 10/1914 | Donald | 198/715 |
| 2,758,703 | 8/1956 | Hampf | 198/715 |
| 2,919,791 | 1/1960 | Hampf | 198/715 |
| 3,788,453 | 1/1974 | Varney | |
| 4,442,932 | 4/1984 | Sushiki et al. | 198/429 X |

FOREIGN PATENT DOCUMENTS

| | | |
|---|---|---|
| 246037 | 3/1966 | Australia . |
| 243268 | 10/1987 | European Pat. Off. . |
| 800295 | 7/1936 | France ................................ 198/715 |
| 63-100415 | 6/1988 | Japan . |

Primary Examiner—Cheryl L. Gastineau
Attorney, Agent, or Firm—Dvorak and Traub

[57] ABSTRACT

A goods reception conveyor 17 has a support member 61 capable of excursion along a goods conveying path, and a plurality of flexible goods receptacle members 62 supported by the support member 61 at different positions thereof in the conveying direction. Each goods receptacle member 62 is supported by the support member 61 at an upstream and a downstream point 63B and 63A along the conveying direction such as to be suspended in a flexibly U-shaped form to form a U-shaped goods receptacle 62A. The distance between the upstream and downstream support points of each goods receptacle member 62 is variable.

5 Claims, 20 Drawing Sheets

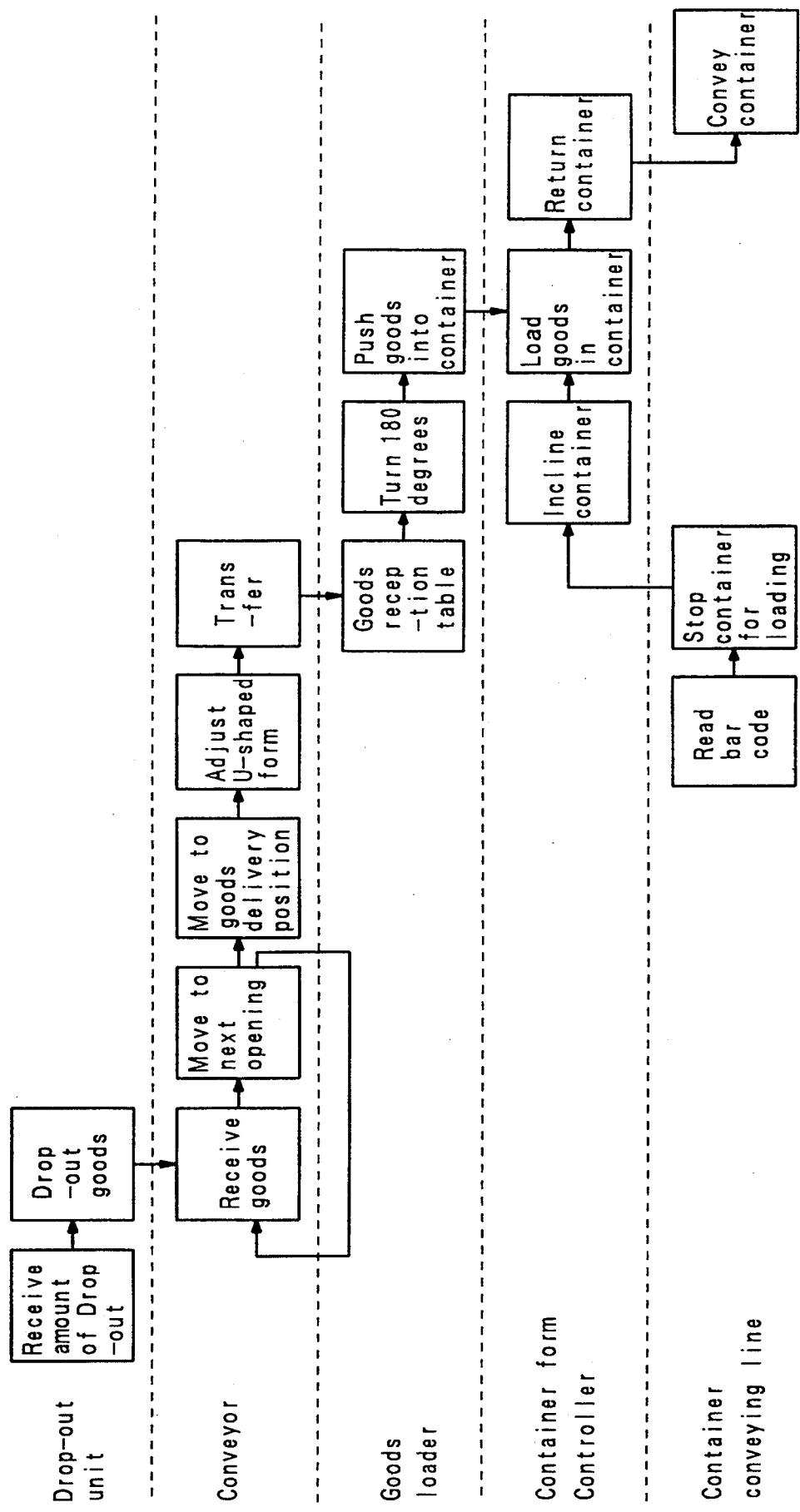

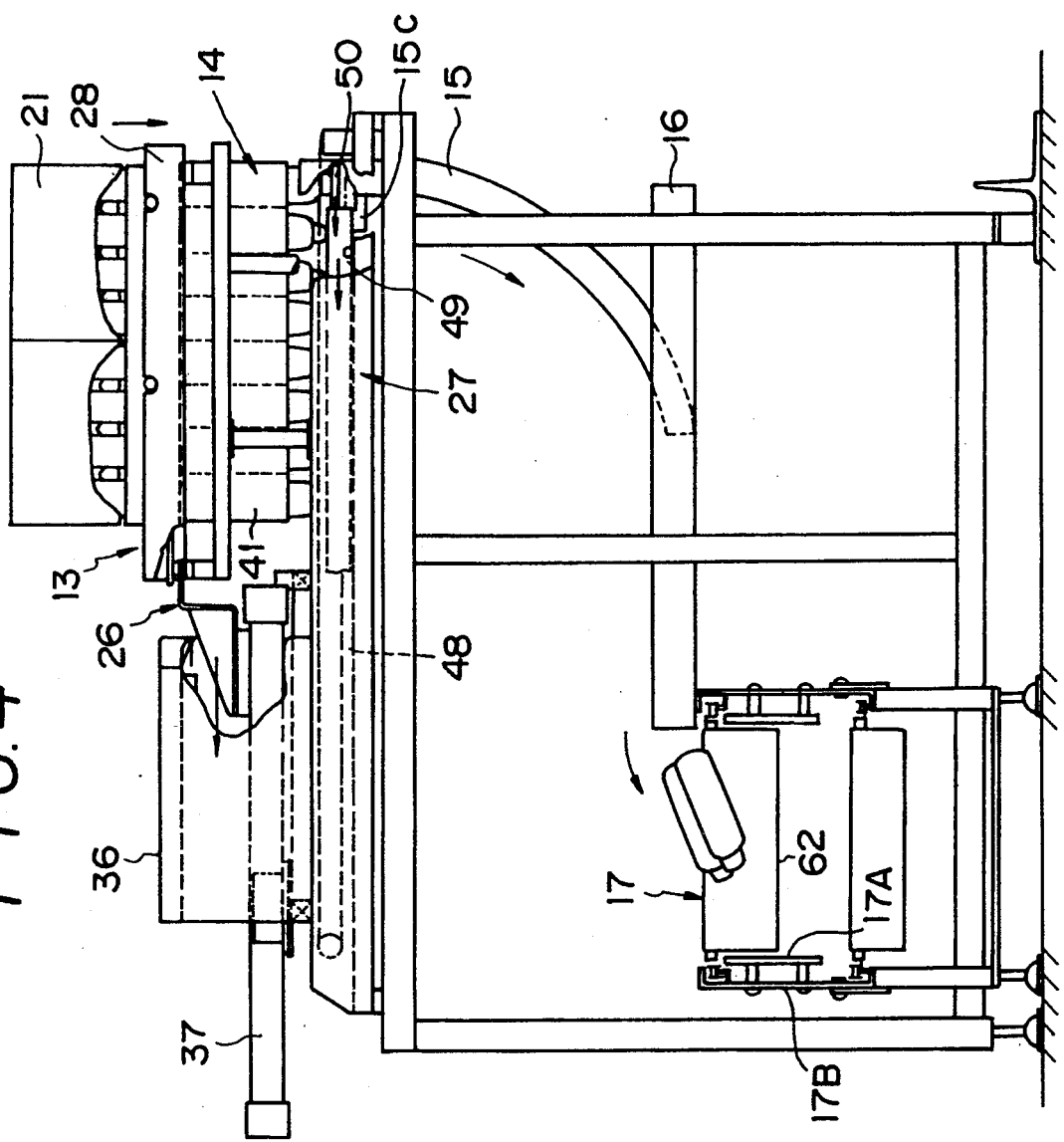

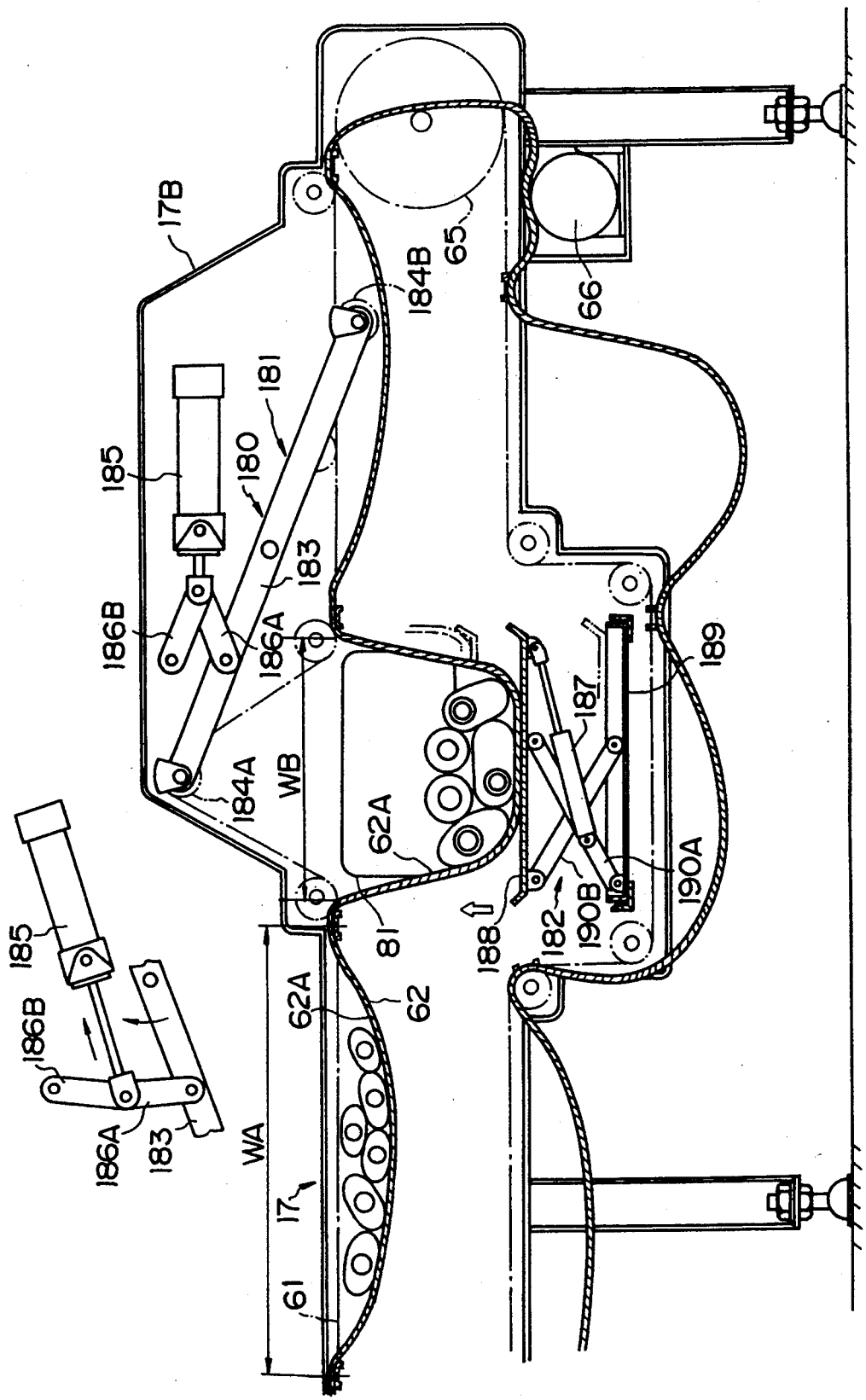

CONVEYOR APPARATUS AND METHOD HAVING FLEXIBLE GOODS RECEPTACLE MEMBERS

BACKGROUND OF THE INVENTION

1. Field of the Invention

The present invention relates to a conveyor apparatus.

2. Description of the Background Art

Japanese Utility Model Laid-Open Publication S63-100415 discloses a conveyor apparatus, which comprises a support member capable of excursion along a goods conveying path, and a plurality of flexible goods receptacle members provided on the support member at different positions thereof along the conveying direction of the support member. Each goods receptacle member is supported by the support member at an upstream and a downstream support point in the conveying direction such that it can be suspended in a flexible U-shaped form to form a U-shaped goods receptacle.

With this conveyor apparatus, since the goods receptacle members are flexible, when goods are thrown into the goods receptacle members, the force of impacts of throwing can be absorbed by the flexing deformation of the goods receptacle members to reduce damage to the goods and generation of noise. In addition, owing to their flexibility the goods receptacle members can undergo flexing deformation such as to fit the forms of the thrown goods to hold the goods in a nearly arranged fashion. For example, a plurality of goods can be held in a stable form of neat arrangement in the longitudinal direction.

In the prior art, however, a plurality of goods are held in each goods receptacle member of the conveyor apparatus in a substantially fixed form alone over the entire range of the U-shaped goods receptacle, and it is impossible to adjust the form of goods in the goods receptacle member. Therefore, when discharging the goods collected in the goods receptacle member, it is difficult to re-form the goods for handling in the discharge place of station.

The present invention seeks to provide a conveyor apparatus, which has goods receptacle members suspended in a flexibly U-shaped form and permits ready adjustment of the form of goods in each goods receptacle member.

In another aspect of the prior art, there is a conveyor apparatus, which comprises a support member capable of excursion along a goods conveying path and a plurality of buckets supported by the support member at different positions in the conveying direction. In this bucket conveyor, goods which are thrown while the conveyor is in excursion along the goods conveying path, are collected and discharged as the bucket opening is directed sidewise or downward at a switching point of discharge in the excursion path of the conveyor.

With this prior art bucket conveyor, however, the collected goods are discharged from the bucket opening such that they fly out. In other words, the goods can not be discharged in a neatly arranged form.

The invention also seeks to permit collected goods of a single kind or a plurality of different kinds to be discharged in a neatly arranged form.

SUMMARY OF THE INVENTION

According to the invention, there is provided a conveyor apparatus, which comprises a support member capable of excursion along a goods conveying path and a plurality of flexible goods receptacle members provided on the support member at different positions thereof in the conveying direction, each of the goods receptacle members being capable of being supported by the support member at an upstream and a downstream support point along the conveying direction such as to be suspended in a flexibly U-shaped form to form a U-shaped goods receptacle, the distance between the upstream and downstream support points of each goods receptacle member being variable.

The invention further provides in conjunction with the conveyor apparatus, a distance adjuster for adjusting the distance between the support points of each goods receptacle member, the distance adjuster being disposed at a goods discharge position in the goods conveying path.

Since the goods receptacle members of the conveyor are flexible, the impact force of throwing goods into the goods receptacle members can be absorbed by flexing deformation of the goods receptacle members to reduce damage to the goods and generation of noise. In addition, the flexible goods receptacle member can undergo flexing deformation to fit the shape of the thrown goods and holds the goods in a neatly arranged form. For example, a plurality of goods may be held in a stable form of neat arrangement in the longitudinal direction.

The U-shaped form of the goods receptacles may be changed by changing the distance between the upstream and downstream support points of the individual goods receptacle members of the conveyor with respect to the support member; a broad and shallow U-shaped goods receptacle may be formed by increasing the distance between the upstream and downstream support point distance, and a narrow and deep U-shaped goods receptacle may be formed by reducing the support point distance. The form of the goods in the goods receptacle member is adjusted such as to be defined by the U-shaped form of the goods receptacle.

Since the distance adjuster for adjusting the distance between the support points of each goods receptacle member is disposed at a goods discharge position in the goods conveying path, the form of the U-shaped goods receptacle may be changed at the goods discharge position to permit adjustment of the goods collected in the goods receptacle member at the time of the discharge to a form suited for handling in the discharge plate or station.

According to the invention, there is provided a method of discharging goods from a conveyor apparatus, which comprises a support member capable of excursion along a goods conveying path and a plurality of flexible receptacle members provided on the support member at different positions thereof in the conveying direction, each of the goods receptacle members being capable of being supported by the support member at an upstream and a downstream support point along the conveying direction such as to be suspended in a flexibly U-shaped form to form a U-shaped goods receptacle, which method comprises the steps of:

opening the opposite sides of each goods receptacle member at least at a goods discharge position in the goods conveying path;

inserting a pusher provided at the goods discharge position into the U-shaped goods receptacle from an opening of the goods receptacle member on one side thereof; and discharging the goods in the U-shaped goods receptacle from an opening thereof on the other side.

The invention further comprises the step of adjusting the U-shaped form of the U-shaped goods receptacle of each goods receptacle member prior to the insertion of the pusher into the U-shaped goods receptacle.

According to the invention, there is provided a goods discharge unit for a conveyor apparatus, which comprises a support member capable of excursion along a goods conveying path, and a plurality of flexible goods receptacle members provided on the support member at different positions thereof in the conveying direction, each of the goods receptacle members being capable of being supported by the support member at an upstream and a downstream support point along the conveying direction such as to be suspended in a flexible U-shaped form to form a U-shaped goods receptacle, each goods receptacle member having the opposite sides opened at least at a goods discharge position in the goods conveying path, which goods discharge unit comprises a pusher disposed at the goods discharge position, the pusher being inserted into the U-shaped goods receptacle from the opening of the goods receptacle member on one side thereof to push out the goods in the U-shaped receptacle from the opening of the goods receptacle member on the other side thereof.

The invention further provides a goods discharge unit having a U-shaped form adjuster disposed at the goods discharge position for adjusting the U-shaped form of each U-shaped goods receptacle of the goods receptacle member.

The invention further provides a goods discharge unit in which the U-shaped form adjuster is a support point distance adjuster for adjusting the distance between an upstream and a downstream support point of each goods receptacle member.

Since the goods receptacle members of the conveyor are flexible, the force of impact when throwing goods into the goods receptacle members can be absorbed by flexing deformation of the goods receptacle members to reduce damage to the goods and generation of noise. In addition, the flexible goods receptacle members can undergo flexing deformation such as to fit the form the thrown goods so as to hold the goods in a neatly arranged form. For example, a plurality of goods can be held in a neat and stable form of arrangement in the longitudinal direction.

At the goods discharge position, the pusher is inserted into the U-shaped goods receptacle from one side opening of the goods receptacle member to deliver goods in the U-shaped goods receptacle from the other side opening of the goods receptacle member while the goods are held in the neatly arranged form noted above.

Prior to the discharge of goods at the goods discharge position, the U-shaped form of the goods receptacle defined by the goods receptacle member of the conveyor apparatus is changed. Thus, the form of the goods in the goods receptacle member is adjusted such as to be defined by the U-shaped form of the goods receptacle and, as a result, the collected goods are discharged in a form which fits the handling in the discharge plate or station.

The U-shaped form of the goods receptacle is changed with adjustment of the distance between the upstream and downstream support points of the goods receptacle member by the support point distance adjuster. Thus, adjustment of the U-shaped form of the goods receptacle can be obtained with a simple construction.

BRIEF DESCRIPTION OF THE DRAWINGS

The present invention will be more fully understood from the detailed description given below and from the accompanying drawings which should not be taken to be a limitation on the invention, but for explanation and understanding only.

The drawings:

FIG. 3 is a flow chart showing a goods collection process in the picking apparatus;

FIG. 4 is a schematic view showing a state of picking out goods from a goods drop-out unit;

FIGS. 19A and 19B are schematic views showing a modification of the support point distance adjuster of goods receptacle members provided on the goods reception conveyor;

DESCRIPTION OF THE PREFERRED EMBODIMENT

Figure 1A:
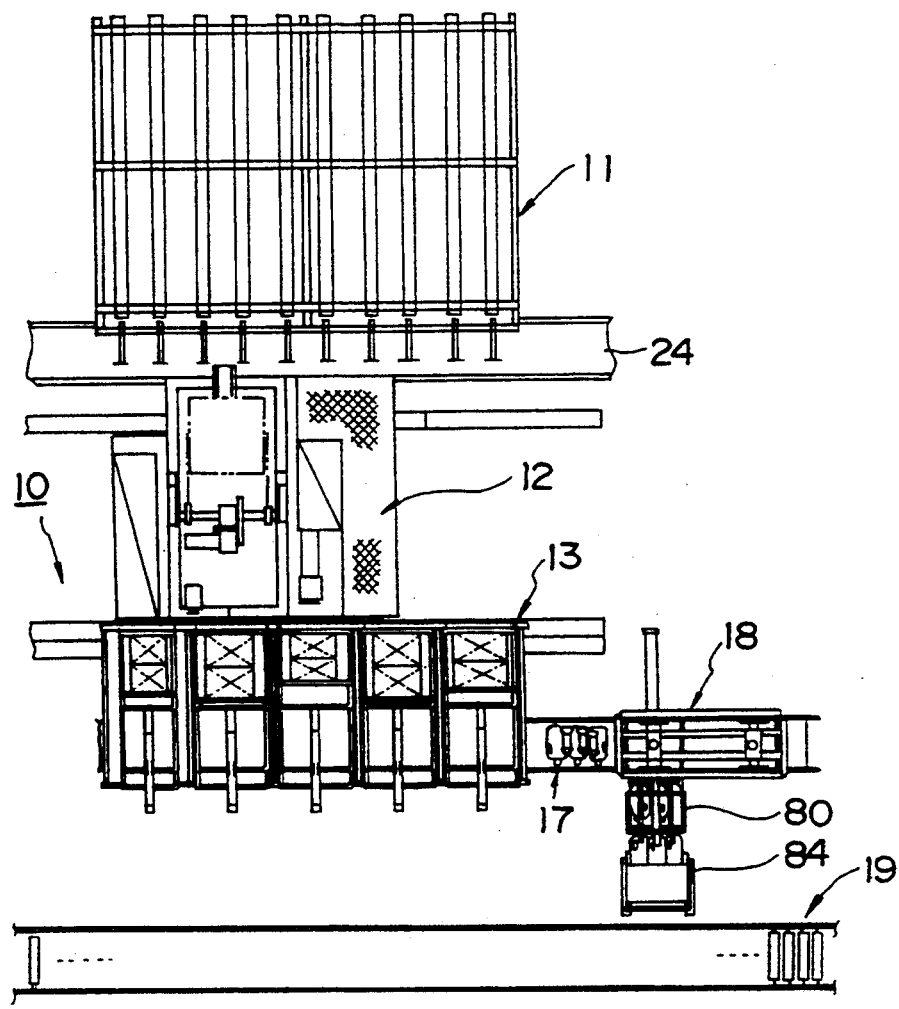
FIGS. 1A and 1B are schematic views showing a picking apparatus.
Figure 1B:
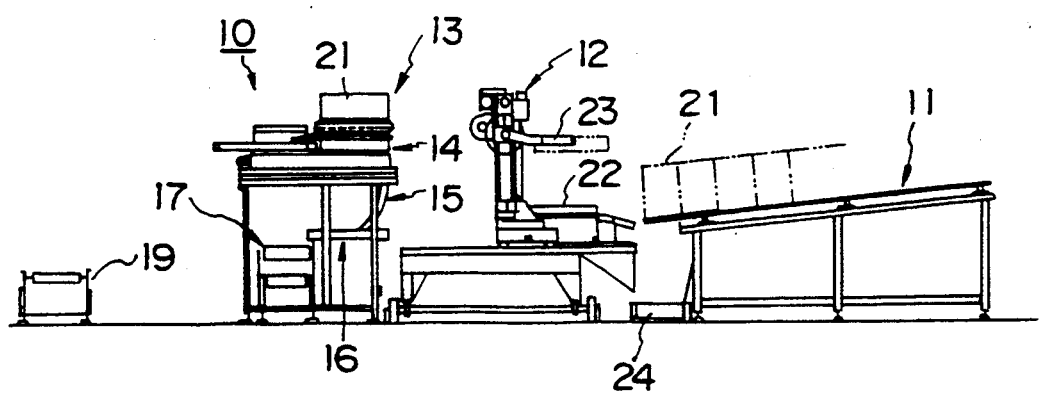

FIG. 1 shows a picking apparatus 10 according to the invention. The apparatus comprises a flow shelf 11, a goods feeding robot 12, goods take-out units 13, goods drop-out units 14, a guide chute 15, a stationary chute 16, a goods reception conveyor 17, a goods loader 18, and a container carrying line 19. The individual components of the apparatus will now be described in detail.

(A) Flow shelf 11 and goods feeding robot 12 (see FIG. 1)

The flow shelf 11 has a plurality of (for instance a first to a twentieth) parallel goods storage zones for storing a plurality of (for instance twenty) different kinds of goods. In each goods storage zone, a row of cardboard cases 21 each containing a plurality of goods or articles of a particular kind are temporarily stored.

The goods feeding robot 12 can run along the forefront of the individual goods storage zones of the flow shelf 11. Specifically, the goods feeding robot 12 picks out each cardboard case 21 in a particular goods storage zone onto a table 22, then mounts a goods take-out unit 13 held by its hands 23 on the top of the cardboard case 21 on the table 22, then turns the cardboard case 21 clamped between the table 22 and the hands 23 by 180 degrees, and then couples the goods take-out unit 13 in this state to the top of a corresponding goods drop-out unit 14. The goods feeding robot 12 also turns an empty cardboard case 21 on a goods drop-out unit 14 together with a corresponding goods take-out unit 13 back toward the forefront of the flow shelf 11 and then allows the empty cardboard case 21 to fall onto a case discharge conveyor 24 which is provided beneath the forefront of the flow shelf 11.

(B) Goods take-out unit 13 and goods drop-out unit 14 (FIGS. 1, 2 and 4 to 8)

A goods take-out unit 13 and a goods drop-out unit 14 are coupled together as a set. The picking apparatus 10 has sets of goods take-out and drop-out units 13 and 14 corresponding in number to the number of (for instance first to twentieth) goods storage zones of the flow shelf 11, i.e., to the number of (for instance twenty) different kinds of goods.

Each goods take-out unit 13 is capable of mounting and dismounting on and out of the top of the adjoining goods drop-out unit 14. After all the goods contained in a cardboard case 21 mounted in the goods take-out unit 13 have been transferred to the lower goods drop-out unit 14 by opening a shutter device 26 of the goods take-out unit 13, a desired number of goods may be dropped out to the side of a guide chute 15 by opening a shutter device 27 of the goods drop-out unit 14.

Figure 7:
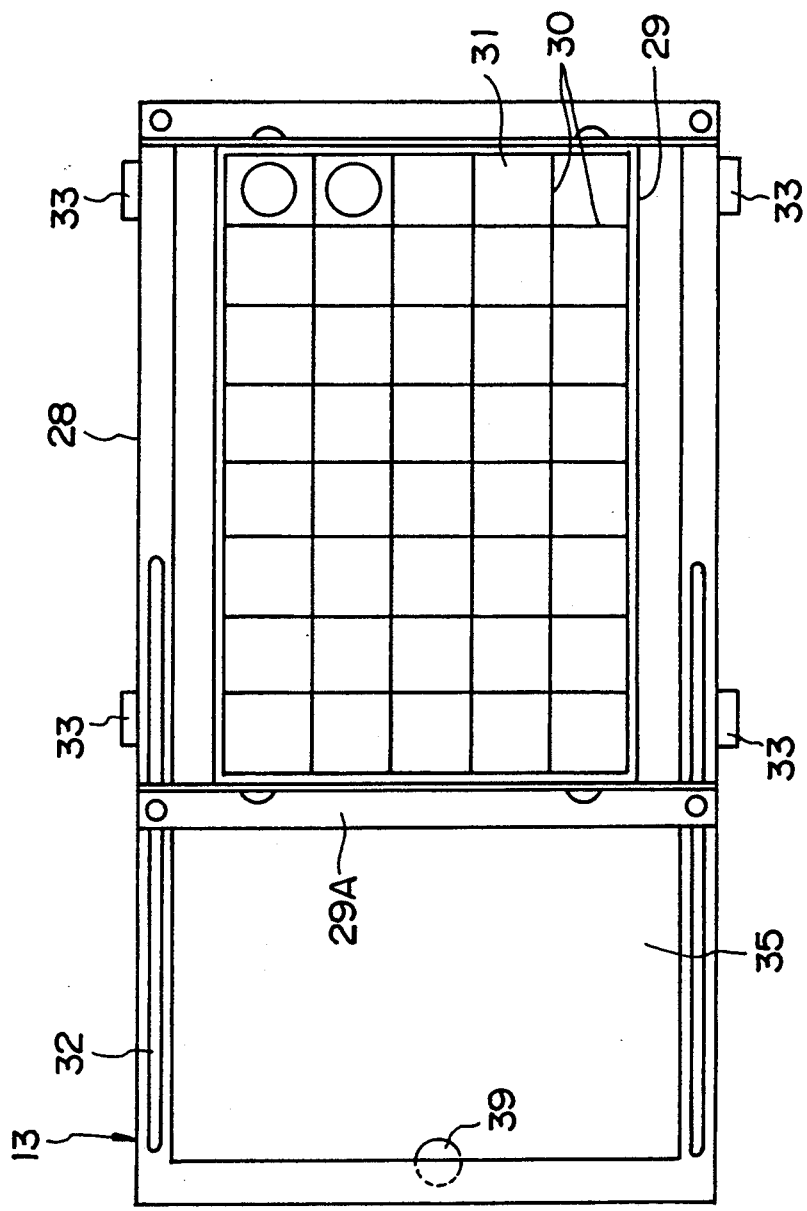
FIG. 7 is a schematic plan view showing the goods take-out unit.

The goods take-out unit 13, as shown in FIG. 7, has a plurality of goods storage sections 31 in a matrix array defined by partitioning members 30 provided in a partitioning frame 29 mounted in a unit frame 48 such as to consist of the same rows (n rows) and columns (k columns) of the goods array in the cardboard case 21. The partitioning frame 29 of the goods take-out unit 13 has a mounting member 29A, the position of which is adjustable in dependence on alteration of goods that are handled. To this end, the unit frame 28 has partitioning frame position adjusting slots 32. The goods take-out unit 13 further has grips 33 to be gripped by the hands 23 of the goods feeding robot 12.

Figures 5A, 5B:
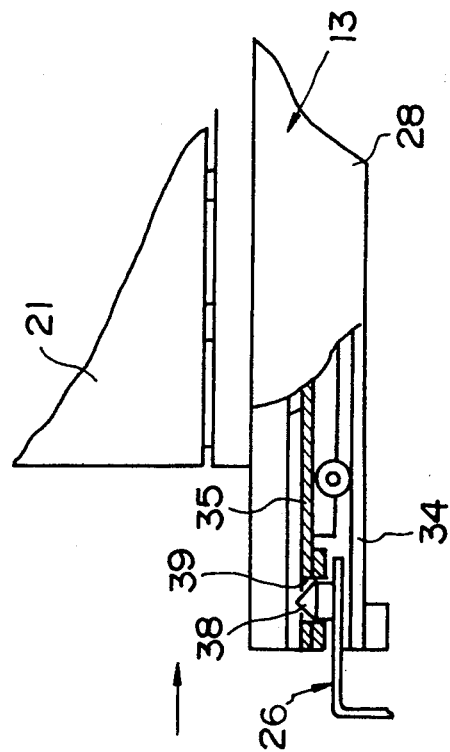
FIGS. 5A and 5B are schematic views showing an essential part of a goods take-out unit.

In the goods take-out unit 13, as shown in FIG. 5, the bottoms of the goods storage sections 31 formed in the partitioning frame 29 can be opened and closed by the shutter device 26 noted above. The shutter device 26 has a opening and closing member 35 which is movable along guide rails 33 provided on the unit frame 28. The opening and closing member 35 has an engagement recess 39, which is capable of engagement and disengagement with respect to an engagement pin 38 on the side of a cylinder 37 supported in a stationary frame 36. When the goods feeding robot 12 couples the goods take-out unit 13 to the top of the goods drop-out unit 14, the recess 39 is engaged on the pin 38. When the cylinder 37 is driven under control of a pick-out controller (not shown), the opening and closing member 35 of the shutter device 26 is moved in the direction of the rows to open all the goods storage sections 31 at a time. As a result, all the goods contained in the cardboard case 21 mounted in the goods take-out unit 13 are transferred to the lower goods drop-out unit 14. The goods feeding robot 12 removes the cardboard case 21 that has become empty together with the goods take-out unit 13 from the goods drop-out unit 14, and then it discharges the empty cardboard case 21 onto the discharging conveyor 24 as noted above. Then, the robot 12 sets a new filled cardboard case 21 in the goods take-out unit 13 and brings the case 21 to the goods drop-out unit 14 again.

Figure 8:
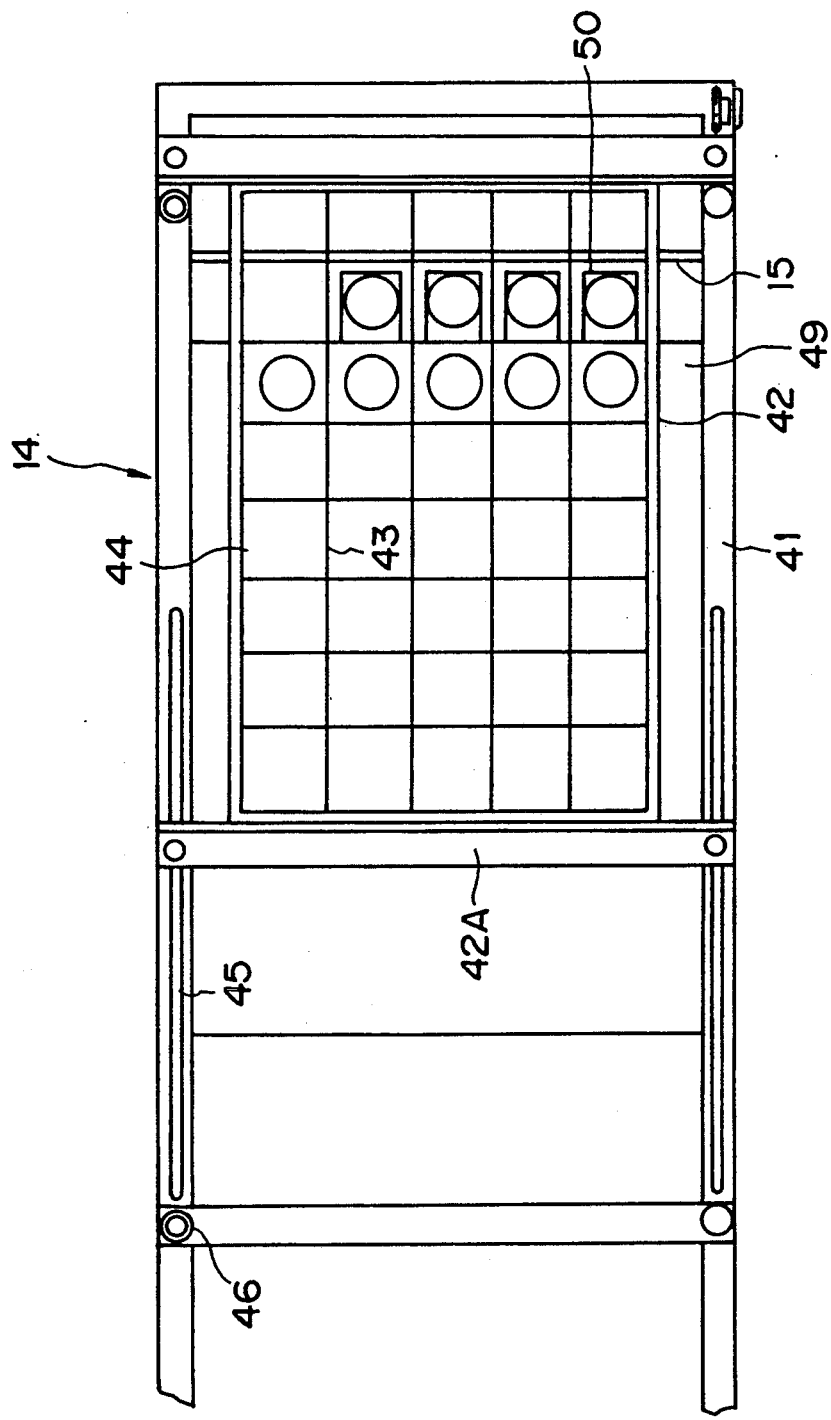
FIG. 8 is a schematic plan view showing the goods drop-out unit.

The goods drop-out unit 14, as shown in FIG. 8, has goods storage sections 44, which are defined by partitioning members 43 provided in a partitioning frame 42 mounted in a unit frame 41 and in the same matrix array as that of the goods take-out unit 13. For adjusting the position of a mounting member 42A of the partitioning frame 42 in dependence on alteration of the kind of goods to be handled, the unit frame 41 of the goods drop-out unit 14 has partitioning frame position adjustment slots 45. The goods drop-out unit 14 has raised and recessed portions 46 to permit mounting and dismounting of the corresponding goods take-out unit 13.

Figure 6A:
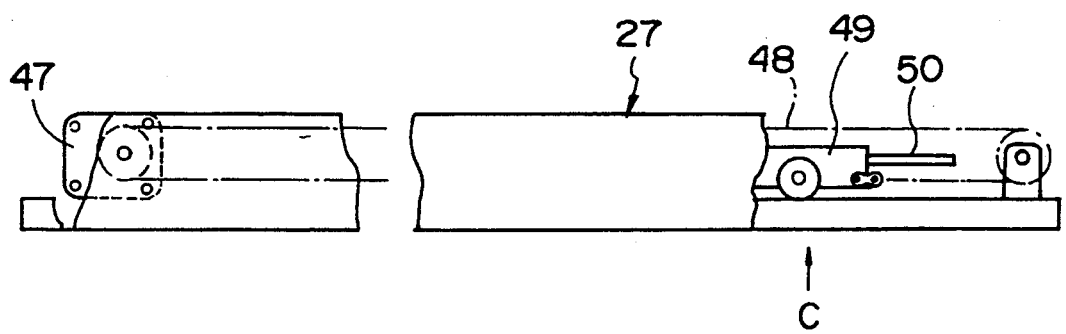
FIGS. 6A to 6C are schematic views showing an essential part of the goods drop-out unit.
Figure 6B:
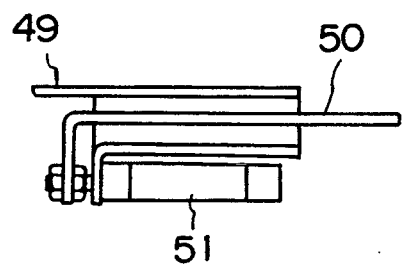
Figure 6C:
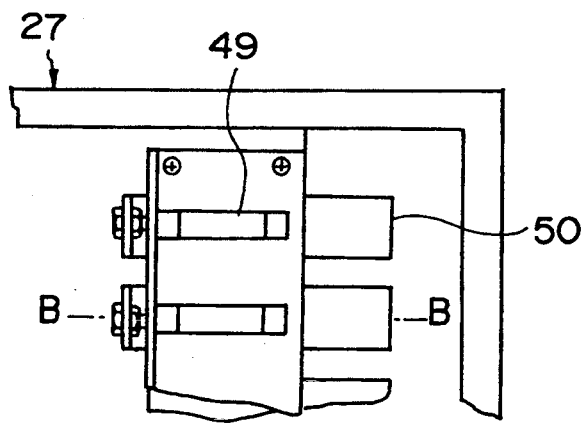

In the goods drop-out unit 14, as shown in FIG. 6, the bottoms of the goods storage sections 44 formed in the partitioning frame 42 can be opened and closed by the shutter device 27 noted above. The shutter device 27 has a large opening and closing member 49 and a plurality of small opening and closing members 50, these opening and closing members being provided on an endless chain 48 which is driven by a motor 47. The large opening and closing member 49 is a wide plate member corresponding to all the row direction drop out openings of the goods storage sections 44, and it can be driven by the motor 47 in the row direction. Thus, it can open the bottom drop out openings of the goods storage sections 44 one row at a time. The small opening and closing members 50 are each provided at an end of the large opening and closing member 49 for each drop out opening in the column direction of the goods storage sections 44 and driven by each cylinder 51 to open and close the bottom drop out opening of the corresponding goods storage section 44 independently. The driving of the cylinders 51 in the shutter device 27 is controlled by the pick-out controller to open the necessary number of filled goods storage sections 44 in the forefront row with the corresponding small opening and closing members 50, whereby goods are dropped out. When all the goods storage sections 44 in one row become empty, the large opening and closing member 49 is moved by the motor 47 to the next row. When the goods storage sections 44 in all the rows become empty, the shutter device 27 is entirely closed, and replenishment goods are received from the goods take-out unit 13.

The small opening and closing member 50 may be of a size corresponding to the minimum distance between adjacent partitioning members 43 of the partitioning frame 42. In this case, a plurality of small opening and closing members 50 may be provided in parallel. In this case, with a greater distance between adjacent partitioning members 43 a plurality of small opening and closing members 50 corresponding to that distance are opened at a time.

Figure 9:
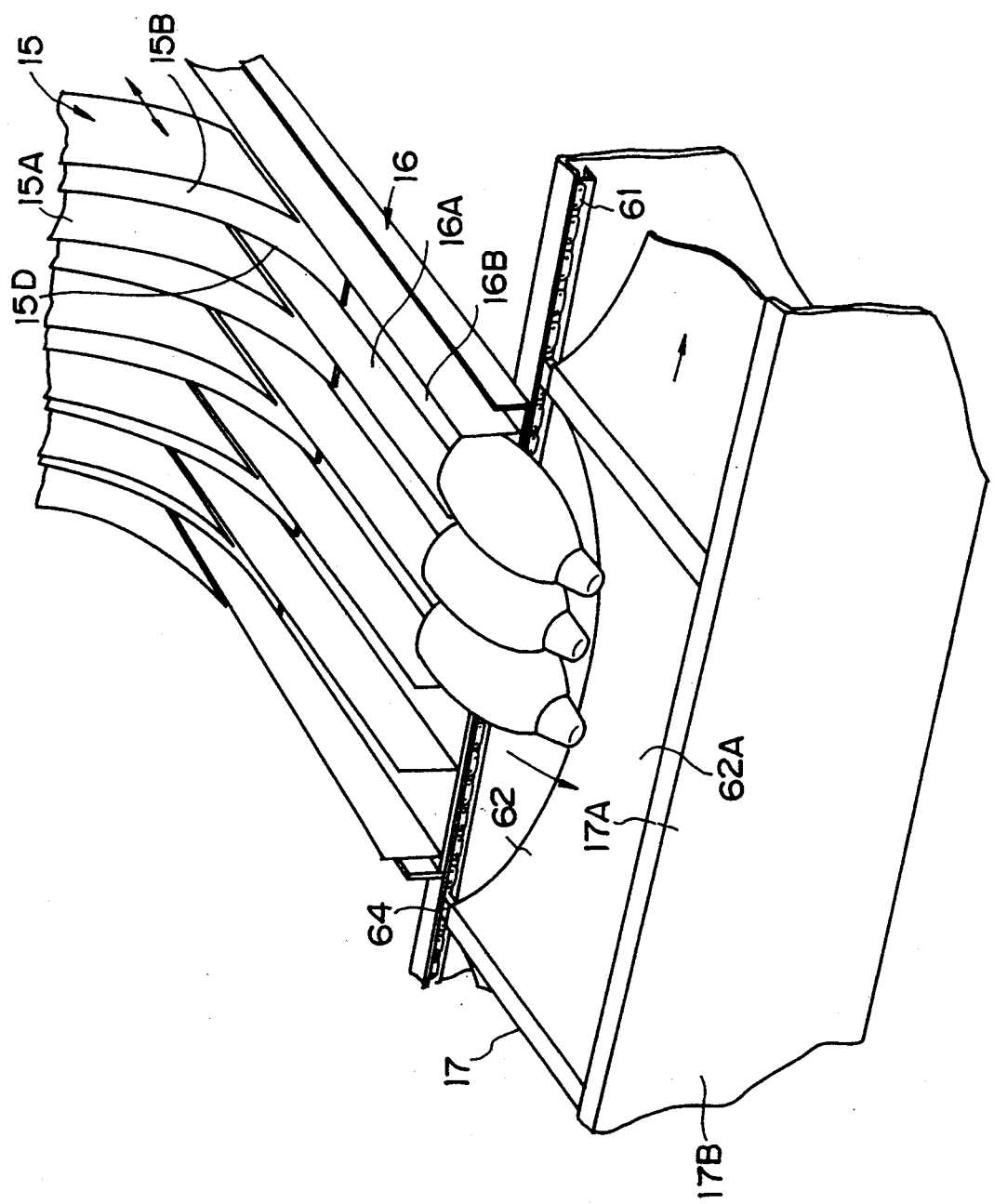
FIG. 9 is a schematic view showing a state of supplying goods from a chute to a goods reception conveyor.
Figure 10:
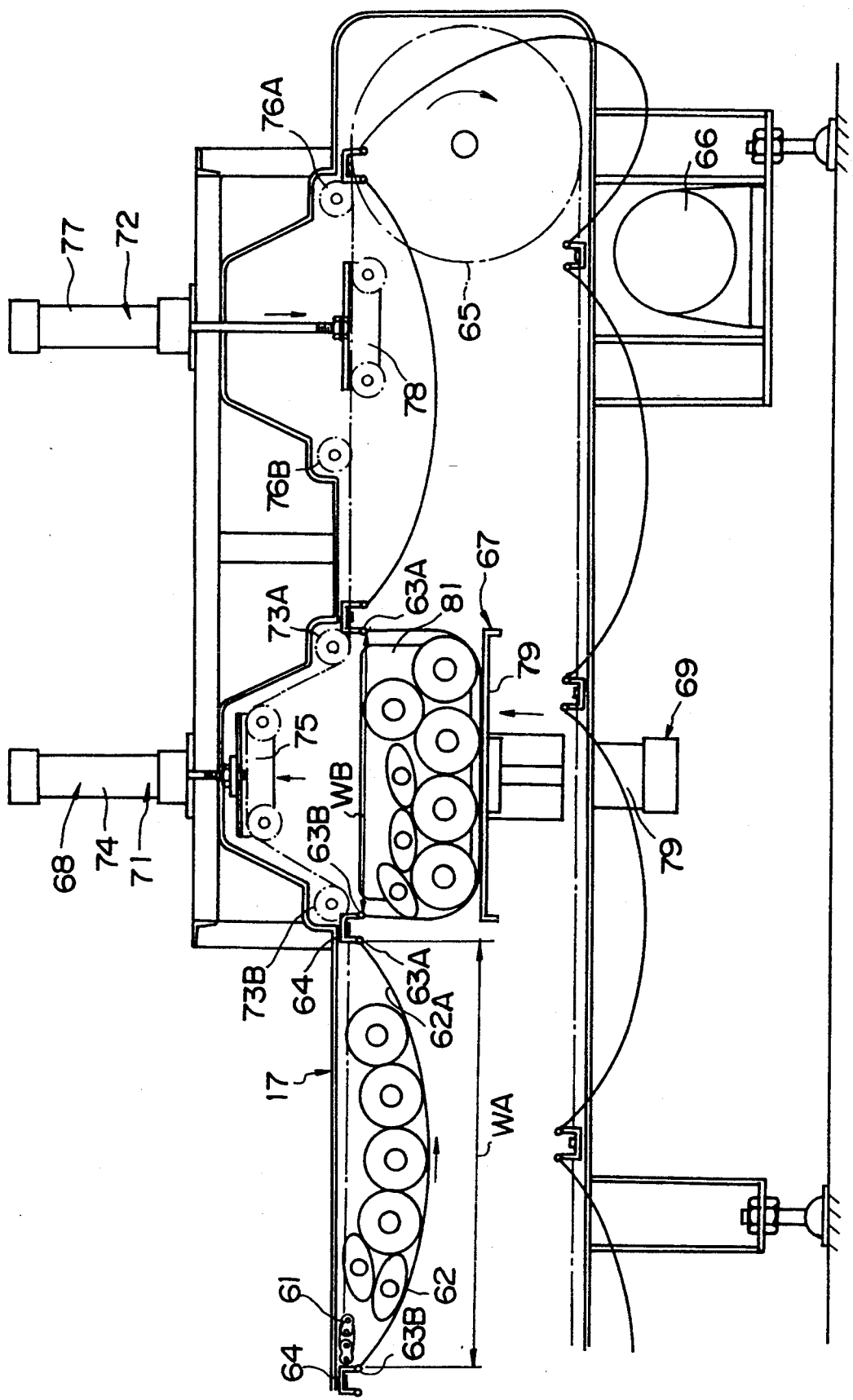
FIG. 10 is a schematic view showing a support point distance adjuster of goods receptacle members provided on a goods reception conveyor.

(C) Guide chute 15 and stationary chute 16 (see FIGS. 4 and 9)

The stationary chute 16, as shown in FIGS. 4 and 9, is disposed beneath each goods drop-out unit 14 and over the entire width (drop-out width) thereof. The rear end of the stationary chute 16 is found directly beneath the drop-out openings of the goods drop-out unit 14, and its front end projects forward from a position beneath the dropout openings of the goods drop-out unit 14 and faces the goods reception conveyor 17.

The stationary chute 16 has a plurality of upright lane walls 16A disposed in the opposite width direction ends and intermediate positions. These lane walls 16A function as means for regulating the lower end of the guide chute 15 and also function to regulate the moving form (orientation) and moving direction of goods. These lane walls 16A correspond to the borderlines between adjacent drop-out openings of the goods drop-out unit 14 and extend continuously or intermittently over the entire length of the stationary chute 16 from the rear to the front end thereof, thus defining corresponding adjacent lanes 16B.

The guide chute 15, as shown in FIGS. 4 and 9, extends from the drop-out openings of the goods drop-out unit 14 to the top surface of the stationary chute 16 for smoothly guiding goods dropped out and falling from the drop-out openings of the good drop-out unit 14 to the stationary chute 16.

The guide chute 15 has upright lane walls 15A corresponding to the borderlines between adjacent drop-out openings of the goods drop-out unit 14 and extend in the longitudinal direction of the chute. The lane walls 15A defines adjacent lanes 15B and regulates the moving form (orientation) and moving direction of goods.

A plurality of goods dropped out from individual drop-out openings of the goods drop-out unit 14, are regulated by the lane walls 15A and 16A of the guide and stationary chutes 15 and 16 to be supplied in a neatly arranged parallel status to each goods receiver 62 of the goods reception conveyor 17.

Where the goods handled are round bottles or like shape articles and can flow in a stable manner, the lane walls 15A and 16A of the guide and stationary chutes 15 and 16 may be dispensed with.

The upper end of the guide chute 15 is secured to a bracket 15C, which is integral with the large opening and closing member 49 of the shutter device 27 of the goods drop-out unit 14. With this arrangement, the guide chute 15 can be automatically positioned with respect to the drop-out openings of the goods drop-out unit 14, from which goods are dropped out by the operation of opening the small opening and closing members 50 provided at the end of the large opening and closing member 49.

The lower end portion of the guide chute 15 depends in a curved fashion such that it is eventually parallel to the top of the stationary chute 16. The guide chute 15 has slit members 15D which are inserted between adjacent lane walls 16A of the stationary chute 16, and the lower end portion of the guide chute 15 eventually becomes parallel to the top of the stationary chute 16 such that it is in frictional contact with the stationary chute top.

The top of the stationary chute 16 may be held stationary such that it is inclined downward from the side of the goods drop-out unit 14 to the side of the goods reception conveyor 17. In this embodiment, however, it is held stationary such that it is parallel to the opening and closing directions of the shutter device 27. Thus, the distance from the point of securement of the guide chute 15 to the shutter device 27 (i.e., bracket 15C) to the top of the stationary chute 16 is constant, and the height of the guide chute 15 is also constant. Thus, the guide chute 15 may be made of rigid members.

Figure 18:
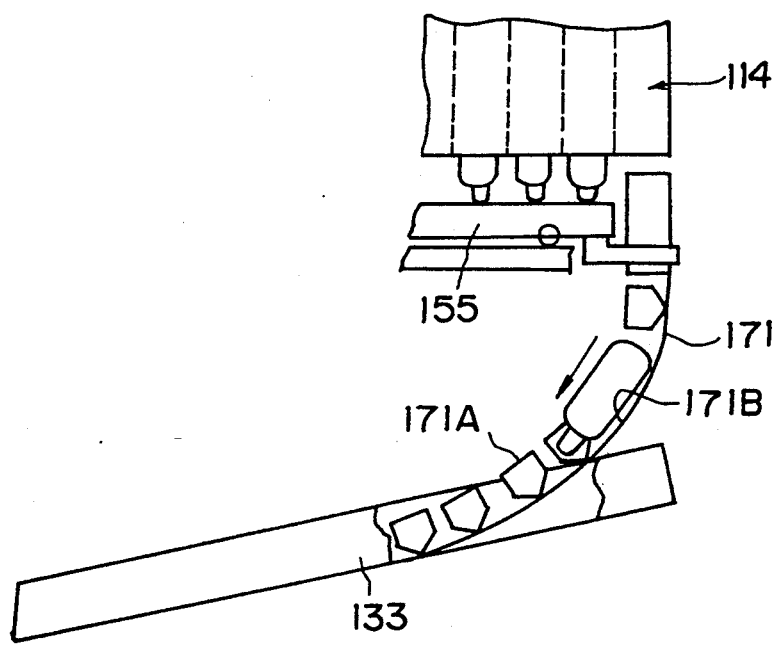
FIG. 18 is a schematic view showing a modification of a guide chute.

FIG. 18 shows a modification of the guide chute 15. This guide chute 171 has lane walls 171A corresponding to the borderlines between adjacent drop-out openings of goods drop-out unit 114 and extending in the longitudinal direction of the chute. The lane walls 171A define adjacent lanes 171B and regulate the moving form (orientation) and moving direction of goods. The lane walls 171A are provided either continuously or intermittently over the entire length of the guide chute 171. Where the lane walls 171A are provided intermittently along the chute, with gaps provided between adjacent ones of them along the chute (see FIG. 18), the guide chute 171 can change its flexed form as it is moved along the top of inclined chute 133 with the movement of large opening and closing member 155 of shutter device 121.

(D) Goods reception conveyor (see FIGS. 4 and 9 to 12)

The goods reception conveyor 17 extends along a goods collection path (goods conveying path), which is set to extend from a position corresponding to the front of the guide and stationary chutes 15 and 16 connected to each goods drop-out unit 14 noted above to a position corresponding to a goods loader 18.

The goods reception conveyor 17 have an endless support member (such as chains) 61 which is capable of excursion along the goods collection path. The support member 61 is provided at a plurality of positions along the conveying direction with flexible goods receptacle members (such as belts) 62. Each goods receptacle member 62 has its upstream and downstream support points 63A and 63B in the conveying direction supportedly coupled via pin joints to struts 64 provided at a predetermined interval on the support member 61. It is suspended in a flexible U-shaped form to form a U-shaped goods receptacle 62A. The flexible goods receptacle member 62 is set such that the goods reception width (opening width) WA of the U-shaped goods receptacle 62A in front of the stationary chute 16 is the same as the width of the stationary chute 16 (i.e., opening width of each goods drop-out unit 14).

Alternatively, the individual goods receptacle members 62 may be formed continuously by a single belt member covering the entire length of the support member 61, with an upstream and a downstream support point 63A and 63B provided for each U-shaped goods receptacle 62A bolted to struts 64.

The goods reception conveyor 17 is driven by a motor 66, which drives a drive wheel 65 with the support member 61 passed thereround. Under control of the pick-up controller, the support member 61 is driven intermittently in a timed relation to the drop-out of goods from the goods drop-out unit 14. The goods receptacle members 62 are thus pitch fed at an interval corresponding to the width of the U-shaped goods receptacle 62A, and thus they are brought one after another to a position in front of each stationary chute 16.

The goods reception conveyor 17 thus undergoes excursion while collecting goods dropped out from each goods drop-out unit 14 in each goods collection section 62A via each stationary chute 16.

At this time, the goods dropped out from each goods drop-out unit 14 are allowed owing to the gravitational energy of position along the guide and stationary chutes 15 and 16 in a direction perpendicular to the conveying direction of the goods reception conveyor 17. At a position, at which goods are thrown out from the stationary chutes 16, the goods receptacle members 62 are closed on their side opposite the stationary chute side by a stopping member 17A. In this embodiment, the stopping member 17A is provided on a base frame 17B of the goods reception conveyor 17. Alternatively, the stopping member 17A may be provided on the support member 61 or on the good receptacle members 62.

Further, at least a portion of the stopping member 17A, which is struck by goods at the position of throwing of goods from the stationary chutes 16, is suitably made of rubber or like shock absorbing material.

With this arrangement, the goods which have been dropped out from each goods drop-out unit 14 and supplied to the good receptacle member 62 by sliding along the guide and stationary chutes 15 and 16, strike the stopping member 17A, and further the energy of impact is absorbed by the flexing deformation of the goods receptacle member 62 before the goods are retained in the U-shaped goods receptacle 62A. With the flexing deformation of the goods receptacle member 62, the collected Goods retained in the U-shaped Goods receptacle 62A are held with their longitudinal direction aligned to the direction normal to the conveying direction of the Goods receptacle member 62, and their collected state in a parallel arrangement is maintained in the Goods receptacle member 62.

The pick-out controller previously determines the kinds and quantities of goods to be collected in the individual goods receptacle member 62 of the goods reception conveyor 17 according to the quantity of goods accommodated in the U-shaped goods receptacles 62A. The goods reception conveyor 17 is thus brought to successive positions in front of the individual stationary chutes 16 to collect goods into the goods receptacle members 62 via the stationary chutes 16. After attaining the goods collection plan, it proceeds toward the goods discharge position.

The goods collection plan with respect to the individual goods receptacle members 62 of the goods reception conveyor 17 is executed, for instance, as in (1) to (3) below.

(1) When there are orders from shops A, B, ..., as in Table 1 below, the kinds and quantities of goods to be collected in goods receptacle members ①  to ④ are determined such that the amount of goods accommodated in the goods receptacle members 62 is 40L or less. Here, one goods receptacle member is not assigned for orders of two or more shops. In addition, two or more goods receptacle members are not assigned to the same kind of goods.

(2) Then, a drop-out amount data is supplied to each goods drop-out unit 14 in a timed relation to the pitch feed of the goods reception conveyor 17. Specifically, when the goods receptacle member ① arrives at a first goods drop-out unit 14 (for a good kind a), a drop-out quantity data of 6 goods is supplied to the first goods drop-out unit 14. If there are other goods receptacle members in front of other goods drop-out units 14 for receiving dropped-out goods, corresponding drop-out quantity data are also supplied.

(3) The goods drop-out units 14 which have received the drop-out quantity data, drop out the instructed quantities of goods.

As an alternative, it is possible to preliminarily supply drop-out quantity data and instruct the drop-out timings.

In the goods reception conveyor 17, a U-shaped form adjuster 67, which permits adjustment of the U-shaped form of the goods receptacle 62A formed by the goods receptacle member 62, is provided at a goods discharge position (i.e., goods collection position) which is disposed downstream of the stationary chutes 16. The U-shaped form adjuster 67 includes a support point distance adjuster 68 for adjusting the distance between the upstream and downstream support points 63A and 63B of each goods receptacle member 62, and a raiser 69 for raising the U-shaped goods receptacle 62A.

The support point distance adjuster 68 has a first and a second support member raiser 71 and 72. The first support member raiser 71 is disposed above the goods discharge position and includes a pulley row 75 which is vertically movable by a cylinder 74. The pulley row 75 can raise a portion of the support member 61 that is found between an upstream and a downstream pulley 73A and 73B spaced apart a distance smaller than the width of the U-shaped goods receptacle 62A to an upper position above the usual conveying path. As a result, the distance between the upstream and downstream support points 63A and 63B of the goods receptacle member 62 that is located at the goods discharge position is changed to a discharge width WB smaller than the goods receptacle member width noted above. The second support member raiser 72 is disposed downstream the first support member raiser 71 and includes a vertically movable pulley row 78 which is vertically movable by a cylinder 77. The pulley row 78 can return the portion of the support member 61 between an upstream and a downstream pulley 76A and 76B spaced apart the same distance as the distance between the pulleys 73A and 73B noted above from the raised position to the level of the normal conveying path. As a result, the redundant length of the support member 61 that has been held at the raised position by the second support member raiser 72, is converted to the length of raising by the first support member raiser 71. Thus, it is possible to alter the distance between the upstream and downstream support points 63A and 63B of the goods receptacle member 62 without loosening the length of the excursion run of the support member 61.

Figure 11A:
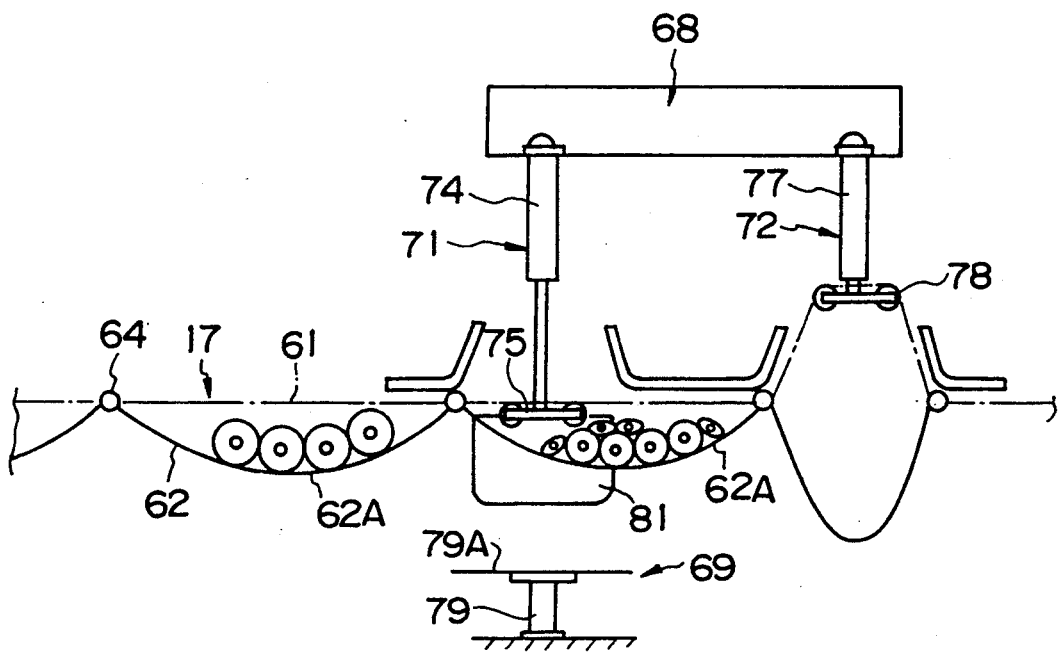
FIGS. 11A and 11B are schematic views illustrating the operation of the support point distance adjuster.
Figure 11B:
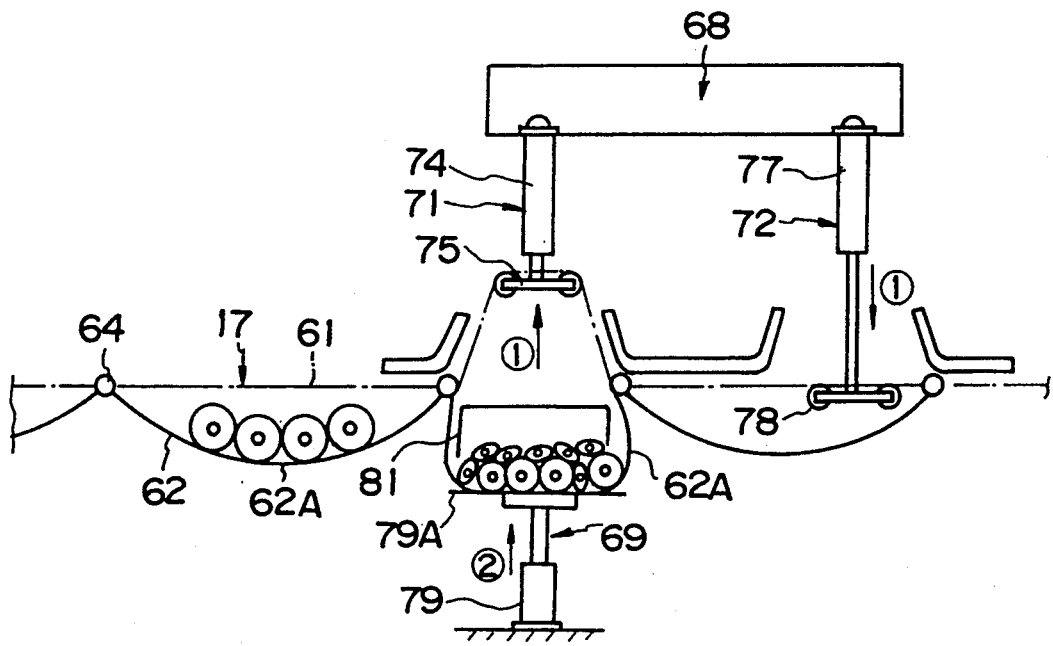

The support point distance adjuster 68, in a goods conveying mode (see FIG. 11(a)), is set by setting the first support member raiser 71 to the normal goods conveying path and setting the second support member raiser 72 to the raised position, the goods receptacle member 62 is moved to bring the U-shaped goods receptacle 62A to the goods discharge position. Then the mode is switched over to a goods discharging mode (see FIG. 11(B)) by setting the first support member raiser 71 to the raised position again and setting the second support member raiser 72 to the normal goods conveying path, and in this mode the U-shaped form of the goods receptacle 62A is adjusted to a narrow width suited for the handling in the discharge place or station by setting the distance between the upstream and downstream support points 63A and 63B of the goods receptacle member 62.

The raiser 69 has a plate 79A, which is disposed beneath the goods discharge position and vertically movable by a cylinder 79. It serves to raise the goods receptacle member 62 that has been adjusted to the width WB and thereby sets the form of the goods in the goods receptacle 62A to a form suited for the handling in the discharge place or station (i.e., form suited to the form of opening of a container 83 (see FIG. 11(B)).

The raiser 69 sets the level of discharge of goods in the goods receptacle member 62 to the goods reception level of a goods reception table 80.

Figure 12:
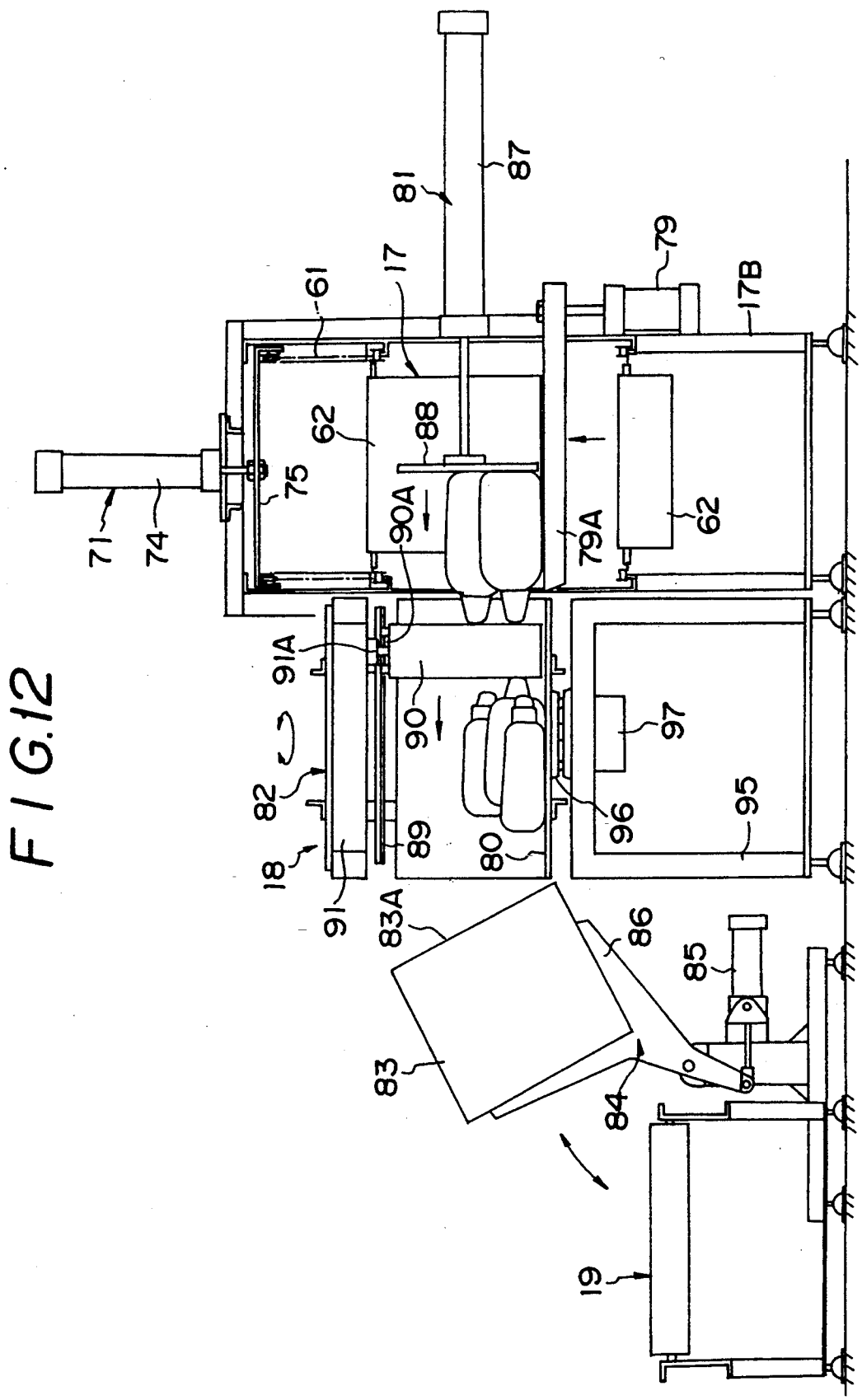
FIG. 12 is a schematic view showing a goods loader.
Figure 13A:
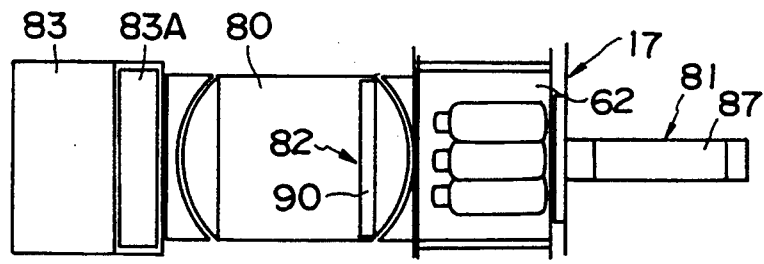
FIGS. 13A to 13F are schematic views illustrating the operation of the goods loader.
Figure 13B:
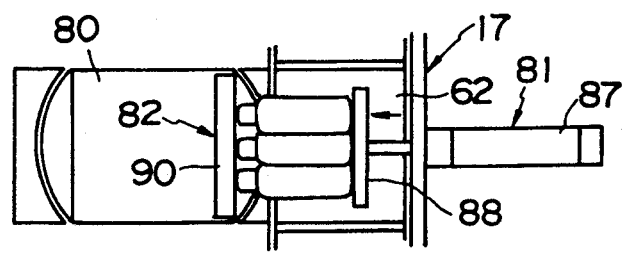
Figure 13C:
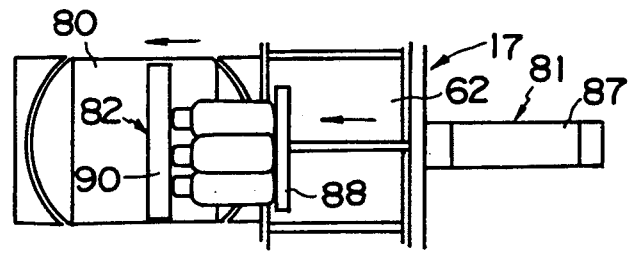
Figure 13D:
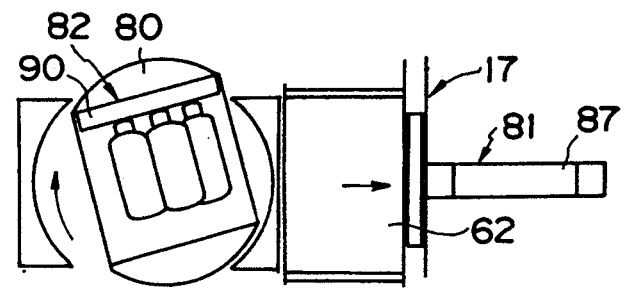
Figure 13E:
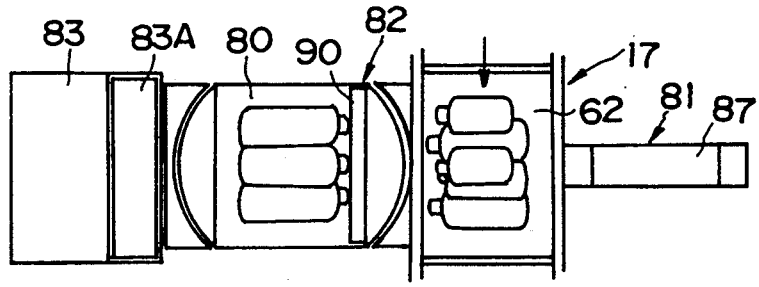
Figure 13F:
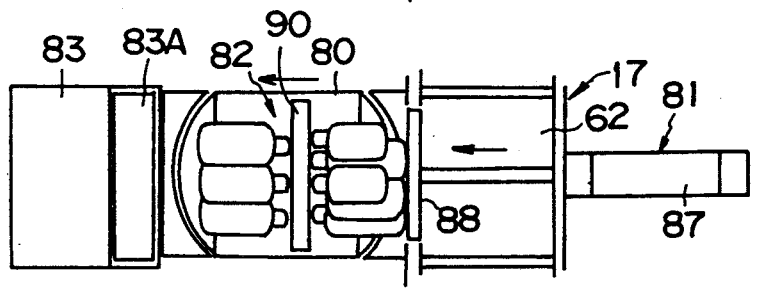
Figure 14:
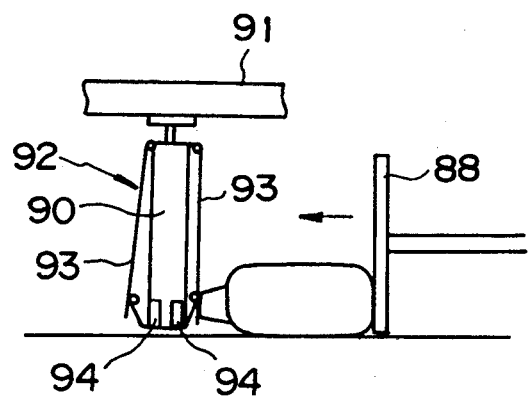
FIG. 14 is a schematic view showing a goods contact sensor.

(E) goods loader (see FIGS. 12 to 14)

The goods loader 18 has a first and a second transferring means 81 and 82. In the goods discharge position, the first transferring means 81 pushes the goods collected on the goods reception conveyor 17 the goods reception table 80 which is located sidewise. The second transferring means 82 pushes the goods brought to the goods receptacle table 80 to transfer the goods into the container 83 which is disposed sidewise.

At this time, at least at the goods discharge position in the goods conveying path (i.e., a position, at which the U-shaped form of the goods receptacle 62A is adjusted by the U-shaped form adjuster 67) each goods receptacle member 62 has its opposite sides opened.

The position of discharge of goods from the goods reception conveyor 17 and the positions of transfer of goods to the goods reception table 80 and the container 83 are disposed along a line.

The position of transfer of goods to the container 83 is determined near one side of a container conveying line 19. At this position, a container form controller 84 is disposed such that it corresponds to the position of the goods reception table 80. The container form controller 84 has a container holder 86, which can be tilted upwardly by a cylinder 85 from a position beneath the roller conveyor of the container conveying line 19 through and between roller conveyors. The container 83, which is to be set at the goods transfer position, is tilted such that its opening 83A is brought to a position to face the goods reception table 80.

The first transferring means 81 has a transferring plate 88 driven by a cylinder 87. In the goods discharge position, the transferring plate 88 can be inserted into each goods receptacle member 62 from one side opening thereof to push out goods, the form of which has been adjusted in the goods receptacle 62A by the U-shaped from adjuster 67, through the other side opening of the goods receptacle 62.

The second transferring means 82 has a transferring plate 90 which is suspended from a linear guide 89 provided on the goods reception table 80. The transferring plate 90 is driven by a cylinder 91 for reciprocation along the linear guide 89. The cylinder 91 and transferring plate 90 are coupled to each other with a pin coupling between a drive pin 91A of the cylinder 91 and an upper end engagement recess 90A of the transferring plate 90.

The second transferring means 82, as shown in FIG. 14, has a contact sensor 92 for detecting the contact of the end of a goods transferred by the first transferring means 81 with the transferring plate 90. When contact members 93 which are pin coupled to the transferring plate 90 are pushed by the goods to actuate limit switches 94, the contact sensor 92 sends a detection signal. The second transferring means 82 starts its own transferring operation in synchronism to the first transferring means 81 in response to the contact detection signal of the contact sensor 92. Thus, in the second transferring means 82, the front contact member 93 pushes the goods on the goods reception table 80 toward the opening 83A of the container 83, and the goods which are being transferred by the first transferring means 81 from the goods reception conveyor 17 onto the goods reception table 80, can be transferred out of the goods reception conveyor 17 in synchronous operation with the first transferring means 81.

The goods reception table 80 is supported on a table 95 via a ball bearing 96 such that it can be rotated by 360 degrees, and it is driven for rotation by a rotary actuator 97.

The goods loader 18 thus operates as follows.

(a) The operation commences when goods collected in the goods receptacle member 62 on the goods reception conveyor 17 arrives at the goods discharge position (see FIG. 13(A)). At this time, the U-shaped form adjuster 67 adjusts the U-shaped form of the goods receptacle 62A to set the form of the collected goods in the goods receptacle 62A to one fitted to the opening 83A of the container 83.

(b) Then, the first transferring means 81 is inserted into the U-shaped goods receptacle 62A from one side opening of the goods receptacle member 62 to transfer the collected goods in the goods receptacle 62A to the side of the goods reception table 80 (see FIG. 13(B)).

(c) When the contact sensor 92 provided in the second transferring means 82 detects the contact of the end of a goods, the second transferring means 82 starts the transferring operation in synchronism to the first transferring means 81, whereby the goods that are to be transferred from the goods reception conveyor 17 onto the goods reception table 80 are transferred by the first transferring means 81 while they are held in the interval between the transferring plates 88 and 90 of the respective first and second transferring means 81 and 82 (see Fig. 13(C)). At this time, the rate of feeding of the operating fluid in the two cylinders 87 and 91 is set by a throttle valve such that the speed V1 of the transferring plate 88 of the first transferring means 81 and the speed V2 of the transferring plate 90 of the second transferring means 82 are $V1 \leq V2$.

(d) After the goods have been transferred onto the goods reception table 80, the goods reception table 80 is turned 180 degrees (see FIG. 13(D)).

(e) Then, the goods reception conveyor 17 is driven to pitch feed the goods receptacle members 62 to the extent corresponding to the width of the U-shaped goods receptacle 62A for taking out the next collected goods to the goods discharge position (see FIG. 13(E)). At this time, the U-shaped form adjuster 67 adjusts the U-shaped form of the goods receptacle 62A as in the step (a), whereby the form of the next collected goods is set to one fitted to the opening 83A of the container 83.

(f) Subsequently, as in the steps (b) and (c) the first and second transferring means 81 and 82 are driven to push and transfer the goods that have been transferred to the goods reception table 80 in the step (d) to the container 83 while at the same time transferring the next goods that the taken in at the goods discharge position in the step (e) from the goods reception conveyor 17 to the goods reception table 80 (see FIG. 13(F)).

Afterwards, the steps (d) to (f) are repeated.

Where the collected goods are cylindrical so that there is no possibility of crushing during the process of transfer from the U-shaped goods receptacle 62A to the goods reception table 80, there is no need of holding the goods in the interval between the two transferring means 81 and 82 by synchronously operating the first and second transferring means 81 and 82.

Figure 2:
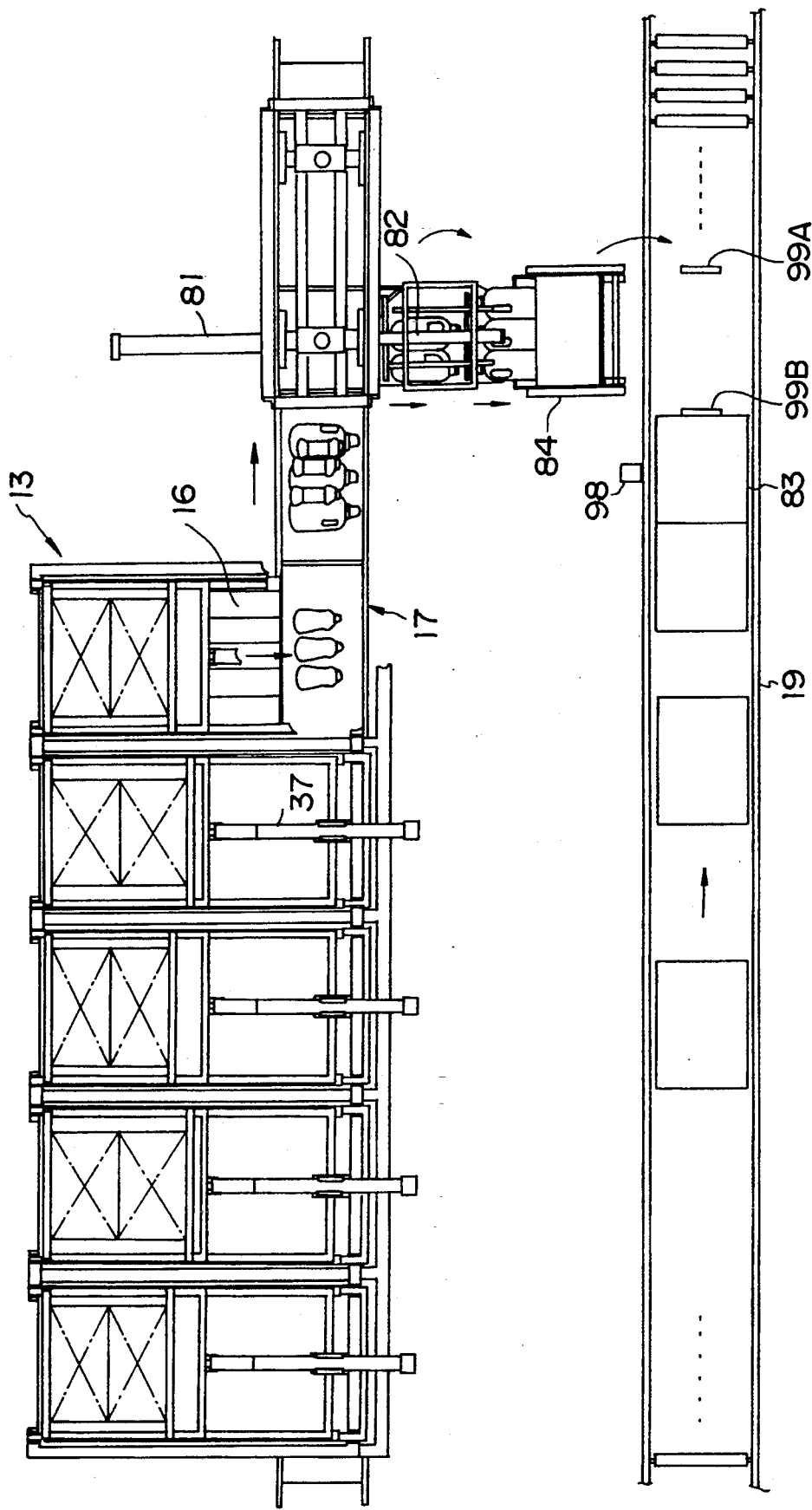
FIG. 2 is a schematic view showing an essential part of the picking apparatus.

(F) Container conveying line 19 (see FIGS. 1, 2 and 12)

The container conveying line 19 is a roller conveyor which extends past the position of goods transfer from the goods reception table 80 to the goods conveyor 83.

The container conveying line 19 is provided with a bar code reader 98 and also with stoppers 99A and 99B which are located upstream and downstream of the container form controller 84, respectively.

The pick-out controller reads a bar code applied to each container 83 and judges that the pertinent container 83 is one, in which to load goods. When it is found that the container 83 is for loading goods therein, this container is stopped by the downstream side container 99A, and at the same time the succeeding containers 83 are also stopped by the upstream side container 99B. Then, the pertinent container 83 is tilted by the container form controller 84 into a turned-down state such that the opening 83A of the container 83 faces the goods reception table 80.

The specific operation procedure of the picking apparatus 10 is as in (1) to (4) below (see FIG. 3).

(1) Operation of the goods drop-out units 14

①  The pick-out controller outputs drop-out goods amount data to corresponding goods drop-out units 14.

② (D Each goods drop-out unit 14 drops out a predetermined number of goods. The dropped-out goods are supplied via guide and stationary chutes 15 and 16 to a predetermined number of goods. The dropped-out goods are supplied via guide and stationary chutes 15 and 16 to a predetermined goods receptacle member 62 on the goods reception conveyor 17.

(2) Operation of goods reception conveyor 17

① The goods reception conveyor 17 is moved intermittently to bring individual goods receptacle members 62 to successive positions in front of a plurality of goods drop-out units 14 and proceeds to the goods discharge position while accommodating goods that may be dropped out from certain goods drop-out units 14 as in the step (1) noted above in pertinent goods receptacle members 62.

When each goods receptacle member 62 arrives at the goods discharge position, the U-shaped form of the U-shaped goods receptacle 62A is adjusted by the support point distance adjuster 68 and raiser 69 of the U-shaped form adjuster 67, whereby the form of the goods in the goods receptacle 62A is set to one fitted to the opening 83A of the container 83 to be discharged.

(3) Operation of goods loader 18

① At the goods discharge position, goods that have been collected in each goods receptacle member 62 on the goods reception conveyor 17 are pushed and transferred by the first transferring means 81 to the goods reception table 80 which is disposed sidewise. The goods transferred to the goods reception table 80 are transferred into a container 83 located sidewise by the second transferring means 82.

② Prior to the transfer of goods from the goods reception table 80 to the container 83 by the second transferring means 82, the goods reception table 80 is turned to change the orientation of the goods on the goods reception table 80 by 180 degrees. Thus, the goods are supplied with the bottom down to the container 83 so that the bottom of the goods can be placed on the inner surface of the open container 83.

(4) Operation of container conveying line 19

① Whether a container 83 is one in which to load goods, is Judged by reading out a bar code on the container 83.

② If the container 83 is one which to load goods, it is tilted by the container form controller 84 to a position, at which the opening 83A of the container 83 faces the goods reception table 80.

③ In the step (3) noted above, the goods pushed by the second transferring means 82 are brought into the container 83.

④ After the goods are loaded in the container 83, the container 83 is brought back by the container form controller 84 to the container conveying line 19.

⑤ The container 83 is then conveyed to the next step.

Now, the operation of this embodiment will be described.

(1) Since the goods receptacle members 62 of the goods reception conveyor 17 are flexible, the impact force produced when goods are thrown into each goods receptacle member 62 can be absorbed by the flexing deformation of the goods receptacle member 62 thus reducing damage to the goods and noise. In addition, owing to the flexibility of the goods receptacle member 62, the thrown goods can be held in nearly arranged form (in which the goods are in a neatly arranged parallel state in the longitudinal direction) with the flexing deformation of the goods receptacle member 62 such as to fit the shape of the goods. For example, a plurality of goods can be held in a stable state of arrangement in the longitudinal direction.

(2) At the goods discharge position, the first transferring means 81 is inserted into the U-shaped goods receptacle 62A from one side opening of the goods receptacle member 62 to push out the goods in the U-shaped goods receptacle 62A from the other opening of the goods receptacle member 62 and thus transfer the goods to the goods reception table 80 waiting at the opening while maintaining the neatly arranged form of the goods obtained in the step ①.

The collected goods that have been transferred by the first transferring means 81 from the goods reception conveyor 17 to the sidewise goods reception table 80, are pushed sidewise by the first transferring means 81 while they are held in the interval between the first and second transferring means 81 and 82 which are operated synchronously. Thus, the collected goods can be transferred from the goods reception conveyor 17 to the goods reception table 80 by the first transferring means 81 without being accompanied by falling impact that may cause damage to the goods or noise thereof. Further, the collected goods are clamped longitudinally between the first and second transferring means 81 and 82 and thus can be transferred to the sidewise goods reception table 80 while the form they have while they are on the goods reception conveyor 17 is maintained.

(3) The collected goods that have been transferred to the goods reception table 80 while maintaining their form, are pushed and transferred from the goods reception table 80 to the sidewise container 83 by the second transferring means 82. Thus, the collected goods are not subject to falling impact that may cause their damage or noise and can be loaded in the container 83 while maintaining their form.

(4) The synchronous operation of the first and second transferring means 81 and 82 in the step noted above, is started upon detection of the contact of the second transferring means 82 with the end of goods by the contact sensor 92. Thus, the first and second transferring means 81 and 82 can execute the synchronous operation by reliably clamping the goods in the longitudinal direction thereof.

(5) Prior to the discharge of goods at the goods discharge position, the U-shaped form of the goods receptacle 62A of the goods receptacle member 62 on the goods reception conveyor 17 is changed. The form of goods in the goods receptacle member 62 is thus adjusted such as to be defined by the U-shaped form of the goods receptacle 62A and, as a result, the collected goods are discharged in their form suited for the handling in the discharge place or station.

(6) The U-shaped form of the goods receptacle 62A of the goods receptacle member 62 on the goods reception conveyor 17 is changed by changing the distance between the upstream and downstream support points of the member 62 relative to the support member 61. That is, the U-shaped goods receptacle 62A becomes wide and shallow by increasing the support point distance while it becomes narrow and deep by reducing the support point distance. The form of the goods in the goods receptacle member 62 is adjusted such as to be defined by the U-shaped form of the goods receptacle member 62A.

(7) The top and bottom of the form of goods accommodated in the container 83 can be readily controlled by turning the goods reception table 80 between the goods reception conveyor 17 and container 83. The goods are transferred such that their bottom is placed on the bottom surface of the container 83.

(8) The guide chutes 15 each have a curve such that the direction of fall of goods dropped out and falling from the goods drop-out unit 14 is changed smoothly to the direction of the stationary chute 16. Thus, the goods dropped out and falling from the goods drop-out unit 14 are led smoothly from the guide chute 15 to the stationary chute 16 and do not strike the stationary chute 16. Thus, the goods are not likely to be damaged, and also their orientation is not likely to be deviated on the stationary chute 16, thus providing for satisfactory goods collection control property in the following steps. Further, the falling speed of the goods is not impeded by any impact with the stationary chute 16, and the goods are not stopped on the stationary chute 16.

At this time, since the guide chute 15 has the lane walls 15A corresponding to the borderlines between adjacent drop-out openings and extending in the length direction of the chute to define the adjacent lanes 15B, the goods dropped out from the drop-out openings can be held in a predetermined form (or orientation) as they run along the guide chute 15. Thus, even flat or like goods which are readily subject to form changes can be led to the stationary chute 16 while they are held in a fixed form.

(9) The guide chute 15 has its upper end secured to the opening and closing member 49 which can open the drop-out openings of each goods drop-out unit 14. The guide chute 15 is successively brought to the positions of the individual goods drop-out units 14. That is, there is no need of providing a guide chute 15 for each goods drop-out unit 14, but a single guide chute 15 can be made to correspond to all the goods drop-out unit 14. It is thus possible to simplify the construction of the apparatus.

(10) Since the top of the stationary guide chute 16 extends parallel to the direction of opening and closing of the opening and closing member 49, the distance between the point of securement of the guide chute 15 to the opening and closing member 49 to the top surface of the stationary chute 16 is constant, and thus the height of the guide chute 15 can be made constant. This means that the guide chute 15 may be made of rigid material and thus can be readily produced. Where the guide chute 15 is made of rigid material, its lanes 15B may have a substantially rigid structure, permitting stable movement of goods.

(11) Since the lower end portion of the guide chute 15 depends such that it is eventually parallel to the top surface of the stationary chute 16, the goods discharged from the guide chute 15 can be led very smoothly in a sliding state to the stationary chute 16.

Now, modifications of individual components of the picking apparatus 10 will be described.

(1) Modification of goods drop-out units (see FIGS. 15 to 18)

Figure 15:
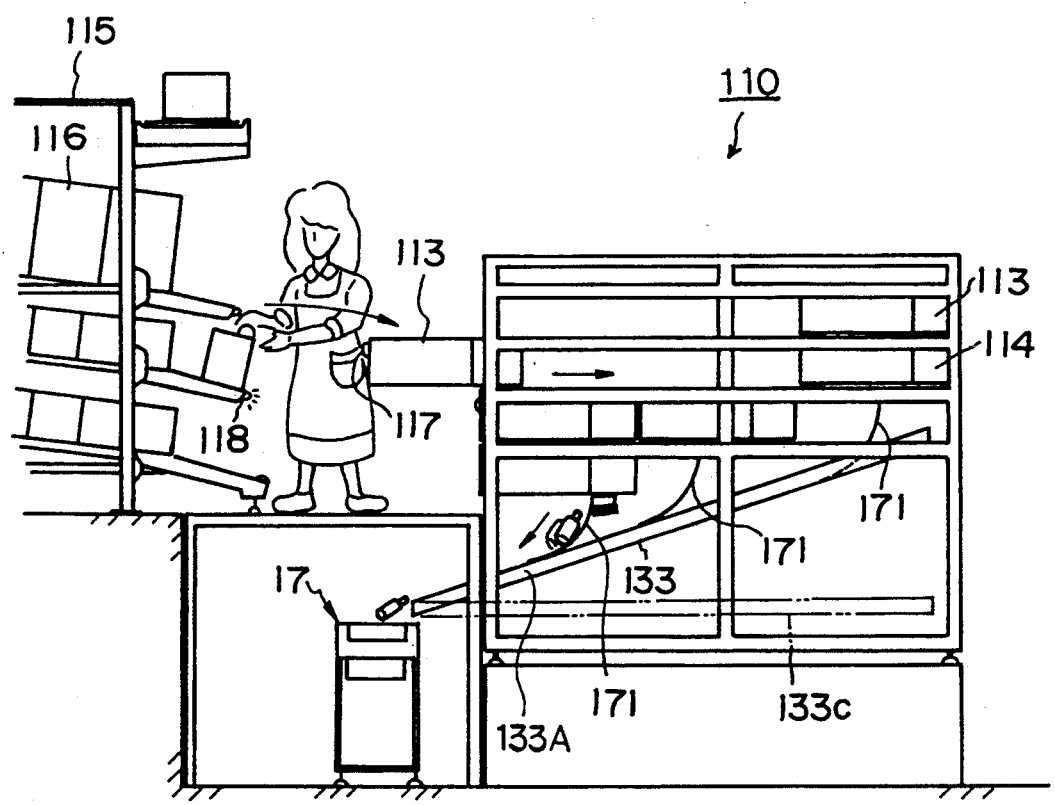
FIG. 15 is a schematic view showing a modification of the picking apparatus.

Shown in FIGS. 15 and 16 is a picking apparatus 110. As shown, a plurality of (for instance 20) sets each of a reserve unit 113 and a drop-out unit 114, for a plurality of (for instance 20) different kinds of goods, are provided as a unit for the goods reception conveyor 17 noted above.

In the apparatus 110, three sets each of a reserve unit 113 and a drop-out unit 114, are provided as three, i.e., a lower (front), an intermediate (intermediate) and an upper (rear), stages in a direction perpendicular to the goods reception conveyor 17 such that they face a flow shelf 115. The upper and intermediate stage reserve units 113 can be moved forward, i.e., to the side of the flow shelf 115 over the respective intermediate and lower stage reserve units 113. The lower stage reserve unit 113 can also be withdrawn. When transferring goods contained in a goods box 116 accommodated in each section of the flow shelf 115 to the corresponding reserve unit 113, the operator withdraws the empty reserve unit 113 from the original position to the side of the flow shelf 115, and after transferring the goods to the reserve unit 113 positioned on the side of the flow shelf 115 pushes back the reserve unit 113 with the goods transferred thereto to the original position.

In the picking apparatus 110, each reserve unit 113 has its front provided with a transfer request indicator 117. When the reserve unit 113 becomes empty, this is notified to the operator with the flickering of the transfer request indicator 117. At this time, a transfer request indicator 118 provided in a corresponding section of the flow shelf 115 will flicker.

As noted above, in the apparatus 110 a drop-out unit 114 is provided under each reserve unit 113. After all the goods having been transferred to the reserve unit 113 are transferred to the lower drop-out unit 114 by opening a shutter device 119 of the reserve unit 113, a desired number of the goods can be dropped out from the drop-out unit 114 to the side of the goods reception conveyor 17 by opening a shutter device 121 of the drop-out unit 114.

In the picking apparatus 110, the reserve and drop-out units 113 and 114 respectively have pluralities of goods storage sections 126 and 127 which are defined by partitioning members 124 and 125 inserted in a reserve box 122 and a drop-out box 123, respectively. Goods which are accommodated randomly or in a predetermined arrangement in each goods box 116 stored in each section of the flow shelf 115, are transferred by manual operation of the operator to each goods storage section 126 in the reserve unit 113, and the goods that have been transferred to the reserve unit 113 are transferred to each goods storage section 127 of the drop-out unit 114 through closing of the shutter device 119. Further, the goods having been transferred to the drop-out unit 114 are dropped out in a unit of the goods storage section 127 through control of the shutter device 121. The shutter devices 119 and 121 are controlled by a drop-out controller (not shown) provided in the picking apparatus 110.

In the picking apparatus 110, goods that are dropped out from a plurality of (for instance 20) drop-out units 114 constituting one unit as noted above, are thrown onto the goods reception conveyor 17 via a guide chute 171 and an inclined chute 133.

Now, the reserve units 113, drop-out units 114, inclined chute 133 and guide chute 171 will be described in greater detail.

Each reserve unit 113 has a plurality of goods storage sections 126 defined as a matrix array of n rows and k columns by partitioning members 124 inserted in the reserve box 122. The reserve box 122, as well as the drop-out box 123 shown in FIG. 17, has a large number of partitioning member insertion slits. When the size of the goods is changed, the array pattern of the goods storage sections 126 defined in the reserve box 122 can be changed to that in the drop-out box 123 by changing the positions of insertion of partitioning members 124 in the same reserve box 122.

In each reserve unit 113, the bottom of the goods storage sections 126 formed in the reserve box 122 can be opened and closed by the shutter device 119 noted above. The shutter device 119, as shown in FIG. 16, has a pair of large gears 142 which are driven by a motor 141 and three pairs of non-driven small gears 143, these gears being disposed on the inner side of opposite side members of the reserve box 122. A pair of endless chains 144 engage the gears 142 and 143, and a large number of struts are carried in succession by portions of the endless chains 144, thus forming an opening and closing member 145. In this shutter device 119, when the motor 141 is driven under control of the drop-out controller, the opening and closing member 145 can be moved in the row direction (see FIG. 17) to open all the goods storage sections 126 in the reserve box 122 at a time, whereby all the goods in the reserve box 122 can be transferred to the lower drop-out unit 114.

Figure 17:
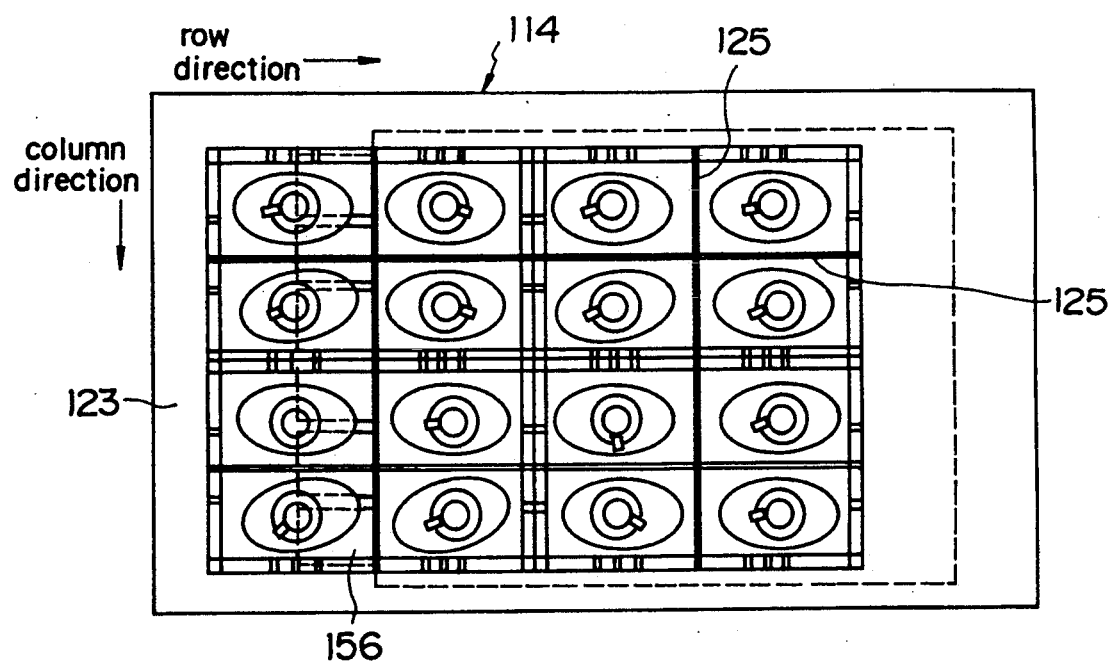
FIG. 17 is a schematic plan view showing a modification of the goods drop-out unit.

Each drop-out unit 114 has a plurality of goods storage sections 127 in a matrix array of n rows and k columns corresponding to those of the goods storage sections 126 formed in the upper reserve unit 113. The drop-out unit 123, as shown in FIG. 17, has a number of partitioning member insertion slits 150. When the size of goods as the subject to be dropped out is changed, the arrangement pattern of the goods storage sections 127 defined in the drop-out box 123 can be changed by changing the positions of insertion 125 of partitioning members in the same drop-out box 123.

Figure 16A:
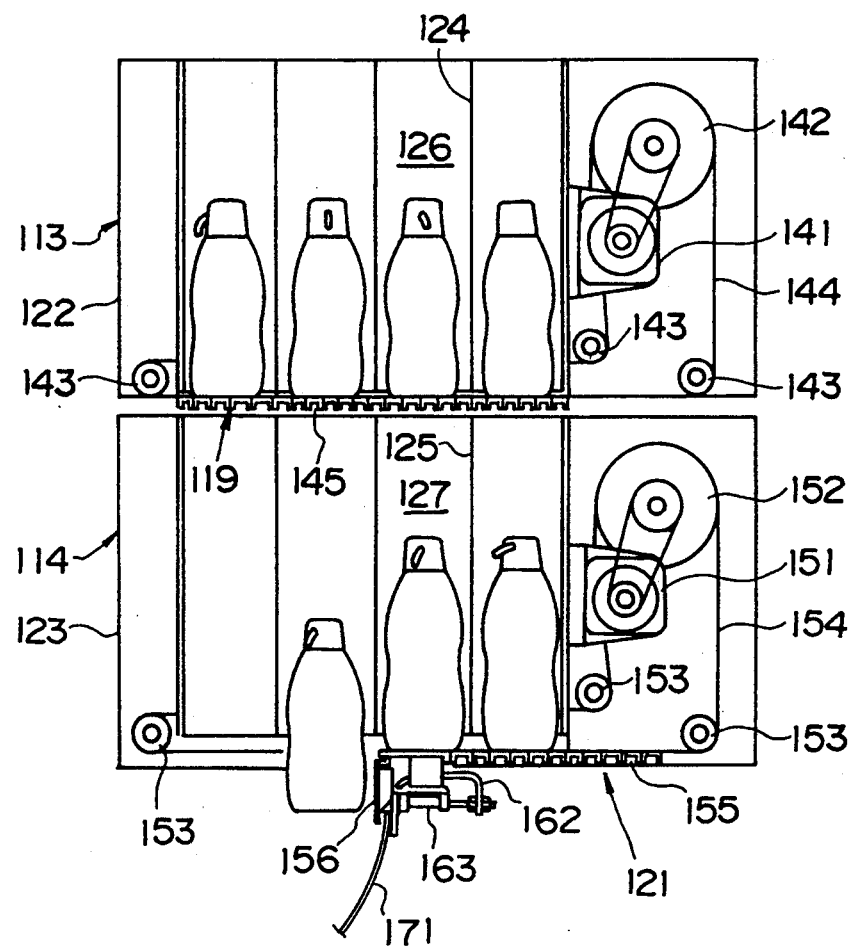
FIGS. 16A and 16B are schematic views showing a modification of the goods drop-out unit.

In the drop-out unit 114, the drop-out openings at the bottom of the goods storage sections 127 formed in the drop-out box 123 can be opened and closed by the shutter device 121 noted above. As shown in FIG. 16A, the shutter device 121 has a pair of large gears 152 driven by a motor 151 and three pairs of non-driven small gears 153, these gears being disposed inside opposite side plates of the drop-out box 123. A pair of endless chains 154 engage the gears 152 and 153, and are provided with a large opening and closing member 155 and a plurality of small opening and closing members 156.

The large opening and closing member 155 has a large number of struts carried in succession in portions of the chains 154. In the shutter device 121, when the motor 151 is driven under control of the drop-out controller, the large opening and closing member 155 can be moved in the row direction (see FIG. 17) to open the bottom drop-out openings of goods storage sections 127 in a unit of row at a time.

Figure 16B:
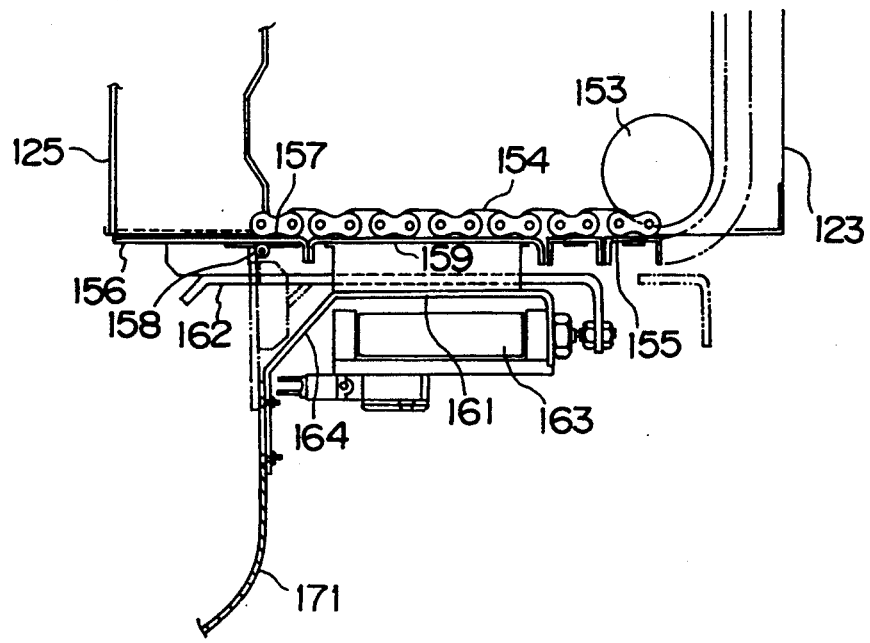

The individual small opening and closing members 156, as shown in FIG. 16(B), are supported in parallel by support members 157 provided at ends of the chains 154 such that they are disposed at the end of the large opening and closing member 155. They can be turned about their shafts 158 which extend substantially parallel to the bottom surface of the goods storage sections 127 to open and close the bottom. An end of a chain 154 is provided with a support member 159, which supports a push rod guide 161. The push rod support 161 supports a push rod 162 and a opening and closing cylinder device 163 both provided for each small opening and closing member 156. Designated at 164 is a bracket. The push rod 162 abuts the underside of the small opening and closing member 156 and is advanced and withdrawn with respect to the underside noted above under guide of the push rod guide 161. The opening and closing cylinder device 163 drives the push rod 162, thus causing the push rod 162 to push up the small opening and closing member 156 so as to close the bottom of the goods storage section 127. When the cylinder 163 pulls back the push rod 162, the small opening and closing member 156 is turned by its own weight to open the bottom of the goods storage section 127. Thus, each small opening and closing member 156 can independently open and close the bottom drop-out opening of the corresponding goods storage section.

The small opening and closing member 156 is of a size corresponding to the minimum distance between adjacent partitioning members 125 inserted in the drop-out box 123. For a greater distance between adjacent partitioning members 125, a plurality of small opening and closing members 156 corresponding to that width are controlled to be opened at a time.

The inclined chute 133, as shown in FIG. 15, is disposed beneath the upper, intermediate and lower stage drop-out units 114 constituting a multi-stage drop-out unit group such that it is inclined to be substantially parallel to the downward slope of these drop-out units 114.

More specifically, the inclined chute 133 has an upper end disposed right under the drop-out openings of the upper stage drop-out unit 114 and a lower end portion projecting from under the drop-out openings of the lower stage drop-out unit 114 and facing the goods reception conveyor 17. The entirety of the inclined chute 133 from the upper end to the lower end is thus disposed in an inclined fashion as noted above.

In the width direction of the inclined chute 133 (i.e., a direction perpendicular to the direction of inclination), upright lane walls 133A are provided at opposite ends corresponding to the width of the drop-out unit 114 and a center position between the opposite ends. These lane walls 133A serve as guide chute lower end position regulation means for supporting the lower and intermediate stage guide chutes and also serve to regulate the direction of conveying goods. The upright lane walls 133A extent continuously over the entire length of the inclined chute 133 from the upper end to the lower end. Alternatively, the upright lane walls 133A may be provided at the borderlines between adjacent drop-out openings of the drop-out unit 114 and extend continuously or intermittently over the entire length of the inclined chute 133 from the rear to the front end thereof, thus defining adjacent lanes 133B, along which goods run.

The guide chute 171, as shown in FIGS. 15 and 18, extends from the drop-out openings of the drop-out unit 114 to the top surface of the inclined chute 133 and smoothly guides goods dropped out and falling from the drop-out openings of the drop-out unit 114 to the inclined chute 133. The guide chute 171 is in the form of a rectangular elastic member.

The upper end of the guide chute 171 is secured to a bracket 164 which is integral with the large opening and closing member 155 of the shutter device 121 of the drop-out unit 114. The position of the guide chute 171 is thus automatically set such that it is positioned at all times to correspond to the drop-out openings of the drop-out unit 114, from which goods are dropped out with the operation of opening small opening and closing members 156 provided at the end of the large opening and closing member 155.

The guide chute 171 has a lower end portion substantially parallel to the top surface of the inclined chute 133. The guide chute 171 corresponding to the top surface of the inclined chute 133 has slit members inserted between adjacent upright lane walls 133A of the inclined chute 133. The guide chute 171 has a lower end portion depending such as to be eventually parallel to the upper stage drop-out unit 114 in frictional contact therewith. The guide chutes 171 corresponding to the intermediate and lower stage drop-out units 114 have lower end portions substantially parallel to the top surface of the inclined chute 133 in sliding contact with top portions of the upright lane walls 113A of the inclined chute 133.

In the picking apparatus 110, the inclined chute 133 may be replaced with a horizontal stationary chute 133C as shown by the phantom line in FIG. 15.

(2) Modification of U-shaped form adjuster (see FIG. 19)

The U-shaped form adjuster 180 includes a support point distance adjuster 181 for adjusting the distance between the upstream and downstream support points of each goods receptacle member 62 of the goods reception conveyor 17, and a raiser 182 for raising the U-shaped goods receptacle 62A.

In the support point distance adjuster 181, a first and a second raiser pulley 184A and 184B are provided pivotally at the opposite ends of a swing bar 183 pivoted to the frame 17B of the goods reception conveyor 17, and the swing bar 183 is caused to swing by a cylinder 185. Two links 186A and 186B are coupled to a cylinder 185. The link 186A is coupled to the swing bar 183, while the other link 186B is coupled to the frame 17B. The first raiser pulley 184A is disposed above the goods discharge position. With contraction of the cylinder 185 a portion of the support member 61 between the upstream and downstream pulleys 73A and 73B spaced apart a distance smaller than the width of the U-shaped goods receptacle 62A is raised to a raised position above the normal conveying path, whereby the distance between the upstream and downstream support points 63A and 63B of the goods receptacle member 62 at the goods discharge position is changed to a goods discharge width WB smaller than the goods reception width noted above. At this time, the second raiser pulley 184B is set downstream of the first raiser pulley 184A to return a portion of the support member 61 between the upstream and downstream pulleys 76A and 76B spaced apart the same distance as that between the pulleys 73A and 73B noted above from the raised position to the normal conveying path. As a result, the redundant length of the portion of the support member 61 held by the second raiser pulley 184B at the raised position can be changed to the raising length provided by the first raiser pulley 184A. Thus, the distance between the upstream and downstream support points 63A and 63B of the goods receptacle member 62 noted above can be changed without generation of loosening in the run length of the support member 61.

The raiser 182 is disposed beneath the goods discharge position, and it has X-like crossed links 190A and 190B. The link 190A has one end pin coupled to a slide rail 189 secured to the frame 17B. The other link 190B has one end pin coupled to the underside of the raiser member 188. The two links 190A and 190B are crossed in an X-like fashion. The other end of the link 190A is slidable along the slide rail 189. The other end of the link 190B is slidable along the underside of the raiser member 188. A cylinder 187 is provided between the link 190A and the raiser member 188. Thus, in the raiser 182, the raiser member 188 which is vertically movable by the cylinder 187 can raise the underside of the goods receptacle member 62 having been adjusted to the discharge width WB noted above, thereby setting the form of the goods in the U-shaped goods receptacle 62A to one suited for handling in the discharge place or station (i.e., form suited to the shape of opening of the container 83).

(3) Modification of U-shaped form adjuster (see FIG. 20)

In U-shaped form adjuster 190, the support point distance adjuster for adjusting the distance between the upstream and downstream support points 63A, 63B of each goods receptacle member 62 of the goods reception conveyor 17 is a modification of the raiser 191 by using the adjuster 68 (see FIG. 10) or adjuster 181 (see FIG. 19).

The raiser 191 includes a movable member 193 which is provided beneath the goods discharge position and movable along a guide 192 in the conveying direction of the goods reception conveyor 17. Upstream and downstream L-shaped arms 194A and 194B are pivoted to the two ends of the movable member 193, respectively.

Figure 20A:
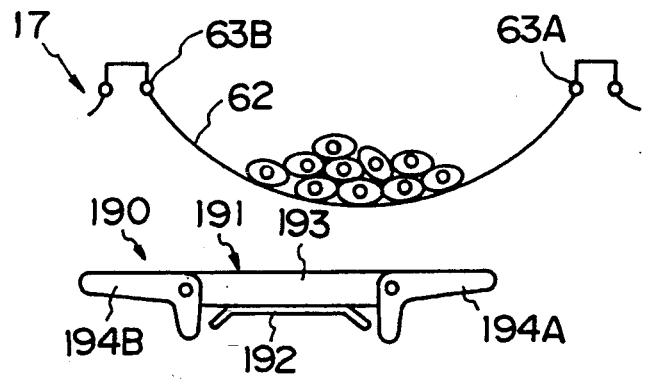
FIGS. 20A to 20D are schematic views showing a modification of a U-shaped form adjuster.
Figure 20B:
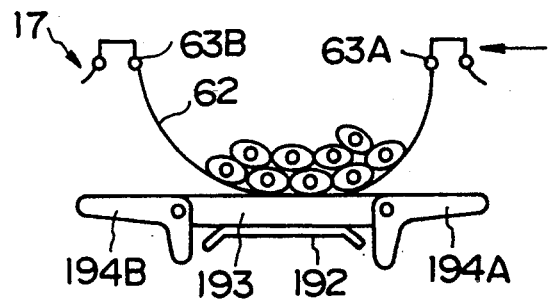
Figure 20C:
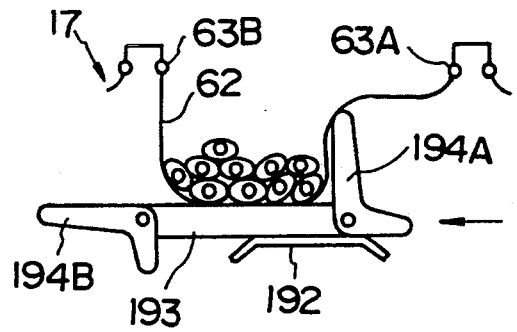
Figure 20D:
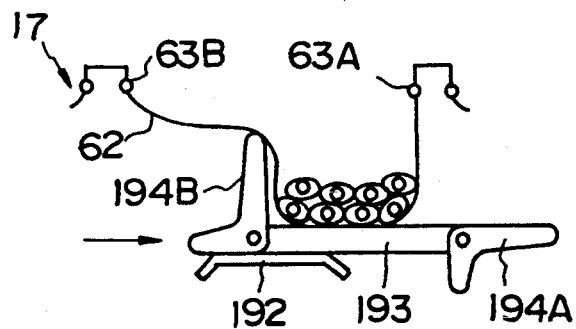

After the distance between the upstream and downstream support points 63A and 63B of the goods receptacle member 62 has been adjusted by the support point distance adjuster from the goods reception width WA to the goods discharge width WB (FIG. 20(A) and 20(B)), by moving the movable member 193 to the left in the Figure the upstream L-shaped arm 194A is raised relative to the guide 192, and the U-shaped goods receptacle 62A is moved rearward. As a result, the width of the U-shaped form of the goods receptacle 62A is reduced to the left one half of the goods discharge width WB. Thus, a suitable form of goods can be formed. If the movable member 193 is moved to the right in the Figure, the downstream L-shaped arm 194B is raised relative to the guide 192, and the U-shaped goods receptacle 62A is moved forward. Thus, the width of the U-shaped form of the goods receptacle 62A is reduced to the right half of the goods discharge width WB to form a suitable form of goods.

In this case, the first transferring means 81 noted above may have left and right transferring means 81 for the respective left and right halves of goods with respect to the goods discharge position.

Figure 21A:
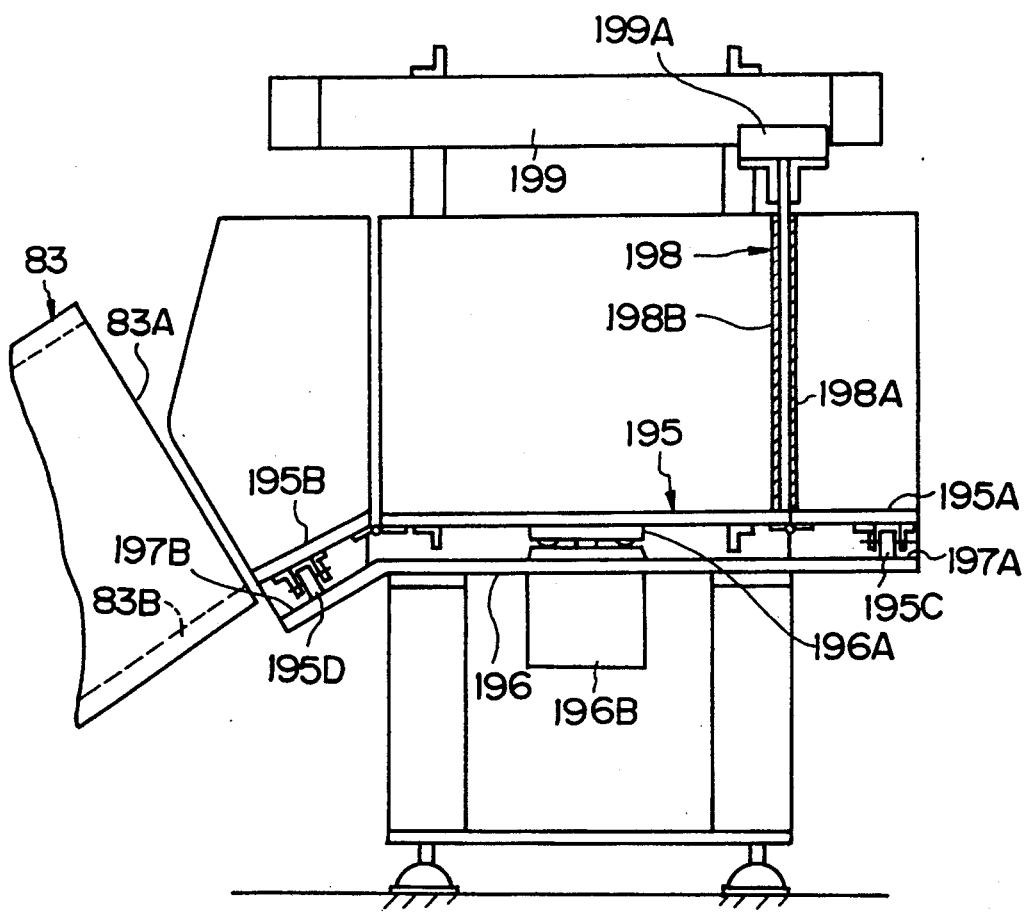
FIGS. 21A and 21B are schematic views showing a modification of a goods loader.
Figure 21B:
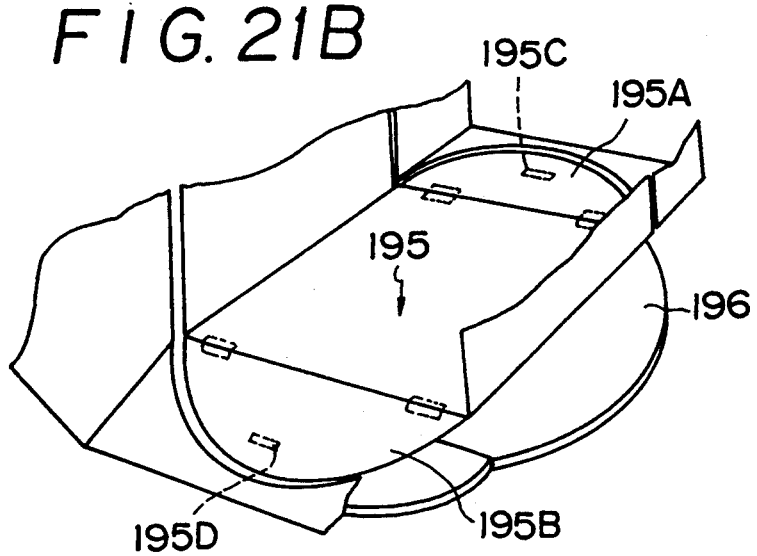

(4) Modification of goods loader (see FIG. 21)

The goods reception table 195 is supported via a roller bearing 196A on a guide table 196 provided on a frame 95 such that it is capable of 180 degree rotation (i.e., reciprocation). It is driven for rotation by a rotary actuator. Swing plates 195A and 195B are hinged to the opposite ends of the goods reception table 195, and they are provided with respective wheels 195C and 195D, which can run along guide surfaces 197A and 197B of the guide table 196. The guide surface 197A is horizontal and extends to the goods discharge position, while the guide surface 197B is downwardly inclined and extends to the goods transfer position to the container 83.

When the swing plates 195A and 195B are supported on the horizontal guide surface 197A extending to the goods discharge position of the goods reception conveyor 17, they are set to the same horizontal surface level as the goods reception table 195 (i.e., goods discharge level of the goods reception conveyor 17 supported by the raiser 69 of the U-shaped form adjuster 67).

When the swing plates 195A and 195B are supported on the inclined guide surface 197B extending to the goods transfer position for transferring goods to the conveyor 83, they are disposed adjacent to in an inclined surface form continuous to the inclined inner wall surface 83B of the container 83 extending from the lower end of the opening 83A. Thus, goods slide along the swing plates 195A and 195B set in an inclined state from the goods reception table 195 to the inner wall surface 83B of the container 83. Thus, goods can be smoothly thrown into the container 83.

Designated at 198 in FIG. 21A is a transferring plate constituting the second transferring means, and at 199 is a rodless cylinder including an internal linear guide. The transferring plate 198 is fixedly coupled to the movable member 199A of the cylinder 199. Pressure switches 198A and 198B are provided on the upstream and downstream sides of the transferring plate 198 to constitute a goods contact sensor.

Figure 22:
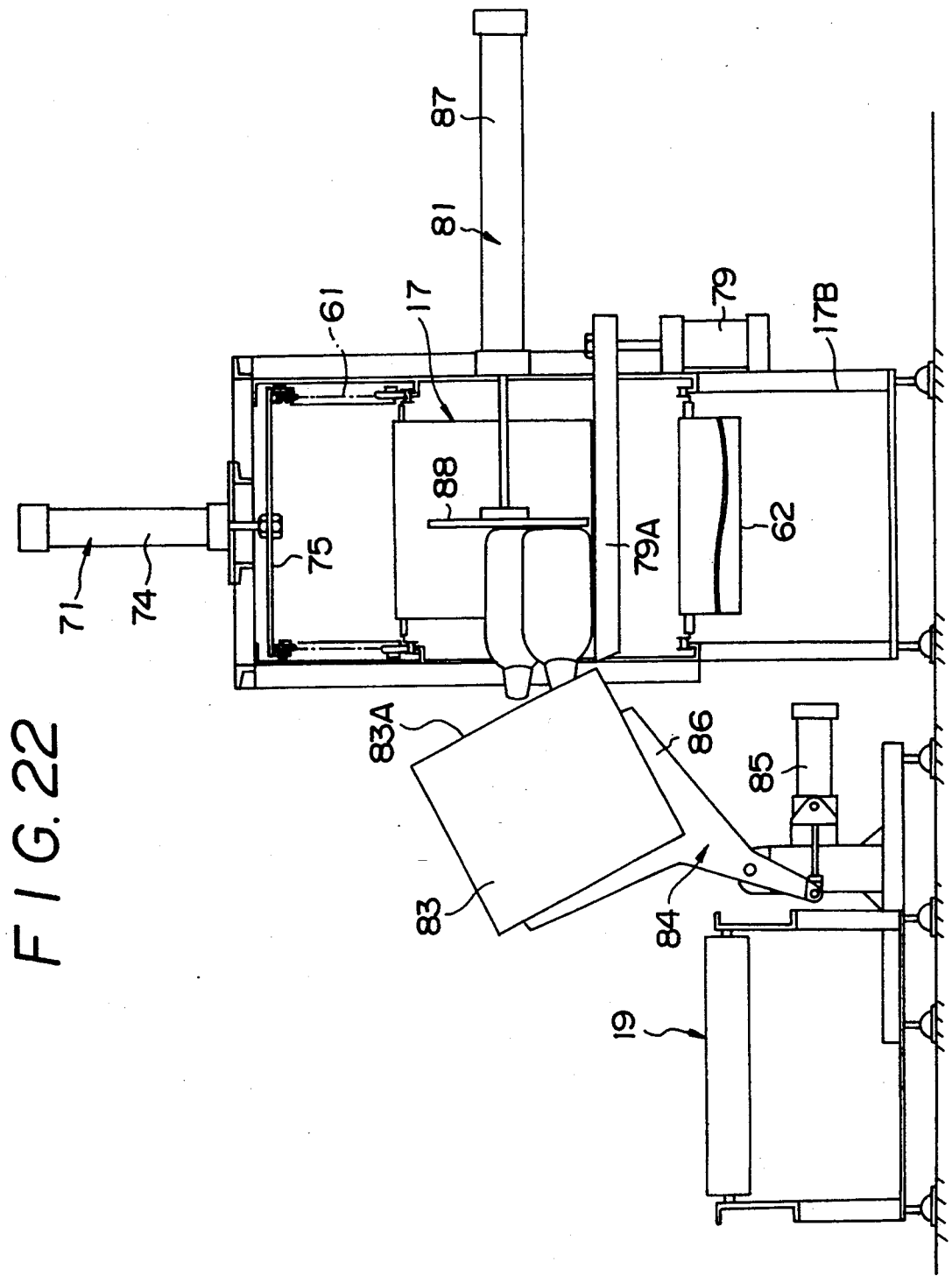
FIG. 22 is a schematic view showing another modification of the goods loader.

(5) Modification with omission of goods reception table (see FIG. 22)

FIG. 22 shows an example, in which no goods reception table is provided between the position of discharge of goods to the goods reception conveyor 17 and the position of transfer of goods to the conveyor 83. Where collected goods which do not require change of the top and bottom are handled for transfer from the goods receptacle member 62 of the conveyor 17 to the container 83, the goods reception table with goods thereon need not be turned 180 degrees. In this case, it is thus possible to omit the goods reception table.

As has been described in the foregoing, with the conveyor apparatus with goods receptacle members suspended in a flexible U-shaped form according to the invention, it is possible to readily adjust the form of goods in the goods receptacle members.

In addition, according to the present invention a single kind or a plurality of different kinds of goods can be discharged in a neatly arranged form.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above but to include all possible embodiments which can be embodied within a scope encompassed and equivalents thereof with respect to the feature set out in the appended claims.

TABLE 1

| Kind (Section) | Quantity | Goods storage amount | Assigned goods receptacle member |
| --- | --- | --- | --- |
| Shop A  a (1) | 6 | 12L ⎫ | |
| b (3) | 12 | 21L ⎬ 38L | →① |
| c (7) | 6 | 5L ⎭ | |
| d (8) | 6 | 16L ⎫ | |
| e (9) | 3 | 5L ⎬ 32L | →② |
| f (11) | 6 | 11L ⎭ | |
| g (15) | 6 | 9L ⎫ 14L | →③ |
| h (20) | 3 | 5L ⎭ | |
| Shop B | — | — | — ④ |

What is claimed is:

1. A method of discharging goods from a conveyor apparatus, having a support member capable of movement along a goods conveying path and a plurality of flexible goods receptacle members provided on the support member at different positions thereof in the conveying direction, each of the goods receptacle members being capable of being supported by the support member at an upstream and a downstream support point along the conveying direction such as to be suspended in a flexibly U-shaped form to form a U-shaped goods receptacle, the method comprising the steps of:

opening the opposite sides of each the goods receptacle member at least at a goods discharge position in the goods conveying path;

inserting a pusher provided at the goods discharge position into the U-shaped goods receptacle from an opening of the goods receptacle member on one side thereof; and discharging the goods in the U-shaped goods receptacle from an opening thereof on the other side.

2. The method of discharging goods from the conveyor apparatus as claimed in claim 1, which further comprises the step of adjusting the U-shaped form of the U-shaped goods receptacle of each the goods receptacle member prior to the insertion of the pusher into the U-shaped goods receptacle.

3. A goods discharge unit for a conveyor apparatus comprising a support member capable of movement along a goods conveying path, and a plurality of flexible goods receptacle members provided on the support member at different positions thereof in the conveying direction, each of the goods receptacle members being capable of being supported by the support member at an upstream and a downstream support point along the conveying direction such as to be suspended in a flexible U-shaped form to form a U-shaped goods receptacle, each the goods receptacle member having the opposite sides opened at least at a goods discharge position in the goods conveying path, the goods discharge unit comprising a pusher disposed at the goods discharge position, the pusher being inserted into the U-shaped goods receptacle from the opening of the goods receptacle member on one side thereof to push out the goods in the U-shaped goods receptacle from the opening of the goods receptacle member on the other side thereof.

4. The goods discharge unit for a conveyor apparatus as claimed in claim 3, which further comprises a U-shaped form adjuster disposed at the goods discharge position for adjusting the U-shaped form of each the U-shaped goods receptacle of the goods receptacle member.

5. The goods discharge unit for a conveyor apparatus as claimed in claim 4, wherein the U-shaped form adjuster is a support point distance adjuster for adjusting the distance between an upstream and a downstream support point of each the goods receptacle member.

* * * * *